(12) United States Patent
Deshpande

(10) Patent No.: US 8,750,835 B2
(45) Date of Patent: Jun. 10, 2014

(54) PRESENCE-BASED COMMUNICATION

(75) Inventor: Manoj Madhukar Deshpande, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/191,394

(22) Filed: Jul. 26, 2011

(65) Prior Publication Data

US 2013/0029660 A1  Jan. 31, 2013

(51) Int. Cl.
*H04L 12/58* (2006.01)
*H04W 40/00* (2009.01)

(52) U.S. Cl.
USPC ........................................ 455/412.1; 455/445

(58) Field of Classification Search
USPC ................... 455/456.1, 412.1, 445
See application file for complete search history.

(56) References Cited

U.S. PATENT DOCUMENTS

2010/0151821 A1* 6/2010 Sweeney et al. ............ 455/410
2010/0304764 A1* 12/2010 Sweeney et al. ............ 455/466
2011/0009097 A1   1/2011 Sweeney et al.
2011/0263220 A1* 10/2011 Bot .............................. 455/406
2012/0009913 A1   1/2012 Yoon et al.

FOREIGN PATENT DOCUMENTS

KR           20100106852 A     10/2010

OTHER PUBLICATIONS

International Search Report and Written Opinion—PCT/US2012/048413—ISA/EPO—Oct. 1, 2012.

* cited by examiner

*Primary Examiner* — Joel Ajayi

(57) ABSTRACT

Presence-based communication involves providing certain communication functionality based on whether an access terminal is present at a presence domain. In some aspects, presence-based communication involves enabling communication between access terminals present at a presence domain. For example, a synchronous communication scheme uses presence information to enable efficient routing of user traffic via a femto cell instead of routing the traffic to the core network over the backhaul. In some aspects, presence-based communication involves using presence information to provide new services where communication is delivered to a user in the correct location context. For example, an asynchronous communication scheme delivers information to an access terminal only if the access terminal is present at a presence domain.

22 Claims, 19 Drawing Sheets

PRESENCE-BASED COMMUNICATION

BACKGROUND

1. Field

This application relates generally to wireless communication and more specifically, but not exclusively, to presence-based communication.

2. Introduction

A wireless communication network is typically deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points may be deployed (e.g., installed in a user's home) to provide more robust indoor wireless coverage or other coverage to access terminals. Such small-coverage access points may be referred to as, for example, femto access points, femto cells, home NodeBs, home eNodeBs, or access point base stations. Typically, such small-coverage access points are connected to the Internet and the mobile operator's network via a DSL router or a cable modem. For convenience, small-coverage access points may be referred to as femto cells or femto access points in the discussion that follows.

Conventionally, a femto cell enables an access terminal to communicate with entities connected to a cellular network or to entities connected to a local area network (LAN). In the former case, the access terminal traffic is routed over the cellular network backhaul to core network entities that then forward the traffic to the specified destinations. In the latter case, the access terminal Internet Protocol (IP) traffic is routed over a LAN connected to the femto cell to other IP entities connected to that LAN.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to presence-based communication where certain communication functionality is provided based on whether a user (e.g., an access terminal of a user) is present at a presence domain. This functionality includes, for example, enabling communication between access terminals present at a presence domain and delivering queued information to an access terminal only when the access terminal is present at a presence domain.

In some aspects, a presence domain corresponds to a set of one or more femto cells. For example, a presence domain may be defined for a single femto cell or for several femto cells. In the single femto cell case, presence of an access terminal at the presence domain may be predicated on whether the access terminal is able to communicate with the femto cell. In the multiple femto cell case, presence of an access terminal at the presence domain may be predicated on whether the access terminal is able to communicate with any one of the femto cells.

The techniques taught herein enable synchronous communication for a femto cell user group and asynchronous communication for a femto cell user (or user group). In the former case, one or more femto cells provide intercom-like synchronous communication in home settings or enterprise settings (e.g., complexes such as businesses, schools, and hospitals) for a plurality of users when these users are in the coverage of the femto cell(s). Advantageously, this communication is not routed through the core network in some implementations. In the latter case, asynchronous communication for a user is provided once the user enters the coverage of the femto cell. Here, the sender of the asynchronous communication information is able to initiate the communication when a targeted user is outside the coverage of the femto cell. The information is then delivered to that user only when the user is within the femto cell coverage.

To facilitate this presence-based communication, access terminals (e.g., handsets), femto cells, and core network elements share presence information relating to the members of a user group (e.g., members of a presence domain). For example, presence information that indicates whether a member has recently established presence at the presence domain is distributed to various entities associated with the presence domain. These entities include, in a typical implementation, access terminals of the users, femto cells of the presence domain, and a presence server of the presence domain.

In a sample implementation, when a femto cell user registers with a cellular network while in femto cell coverage, the femto cell updates the presence information of the user to reflect that the user is present at a location associated with the femto cell (e.g., a residence or enterprise). After successful registration, the handset updates its locally stored presence information and provides visual feedback to the registering user regarding the presence of the handset in the femto cell presence domain. When the femto cell user leaves the femto cell coverage and registers with a macro network, the macro network notifies the femto cell that user has left the femto cell coverage. After registration on the macro network, the handset thus updates its visual feedback to indicate the departure from the femto cell. The user, the handset, the femto cell, and the core network elements also cooperate with one another to present presence information for a given user to all of the members of a corresponding user group, if applicable. In some implementations, a user controls the availability of his or her presence information by configuring permissions to members of the user group.

Various aspects of presence-based communication are described herein. Several examples follow. In some implementations, presence-based communication comprises: determining that an access terminal is present at a presence domain defined for a set of at least one femto cell, wherein the determination is based on presence information for the access terminal; and enabling communication for the access terminal at a femto cell of the set as a result of the determination that the access terminal is present at the presence domain. In some implementations, presence-based communication comprises: receiving information that is indicative of a location of an access terminal; maintaining presence information for the access terminal based on the received information, wherein the presence information is indicative of whether the access terminal is present at a presence domain defined for a set of at least one femto cell; and sending the presence information to at least one entity associated with the presence domain. In some implementations, presence-based communication comprises: determining that an access terminal has registered at an access point; identifying a presence server that maintains presence information for the access terminal, wherein the presence information indicates whether the access terminal is present at a presence domain defined for a set of at least one femto cell; and sending registration information to the presence server, wherein the registration information indicates that the access terminal has registered at the access point. In some implementations, presence-based communication comprises: storing information that is to be delivered to an access terminal; determining that the access terminal is present at a presence domain defined for a set of at least one femto cell; and delivering the stored information to the access terminal as a result of the determination that the access terminal is present at the presence domain. In some implementations, presence-based communication comprises: providing information to be delivered to an access terminal; providing an indication that the information is to be delivered to the access terminal if the access terminal is present at a presence domain for a set of at least one femto cell; and sending the information and the indication to an entity that is to deliver the information to the access terminal.

BRIEF DESCRIPTION OF THE DRAWINGS

These and other sample aspects of the disclosure will be described in the detailed description and the appended claims that follow, and in the accompanying drawings, wherein:

Figure 1:
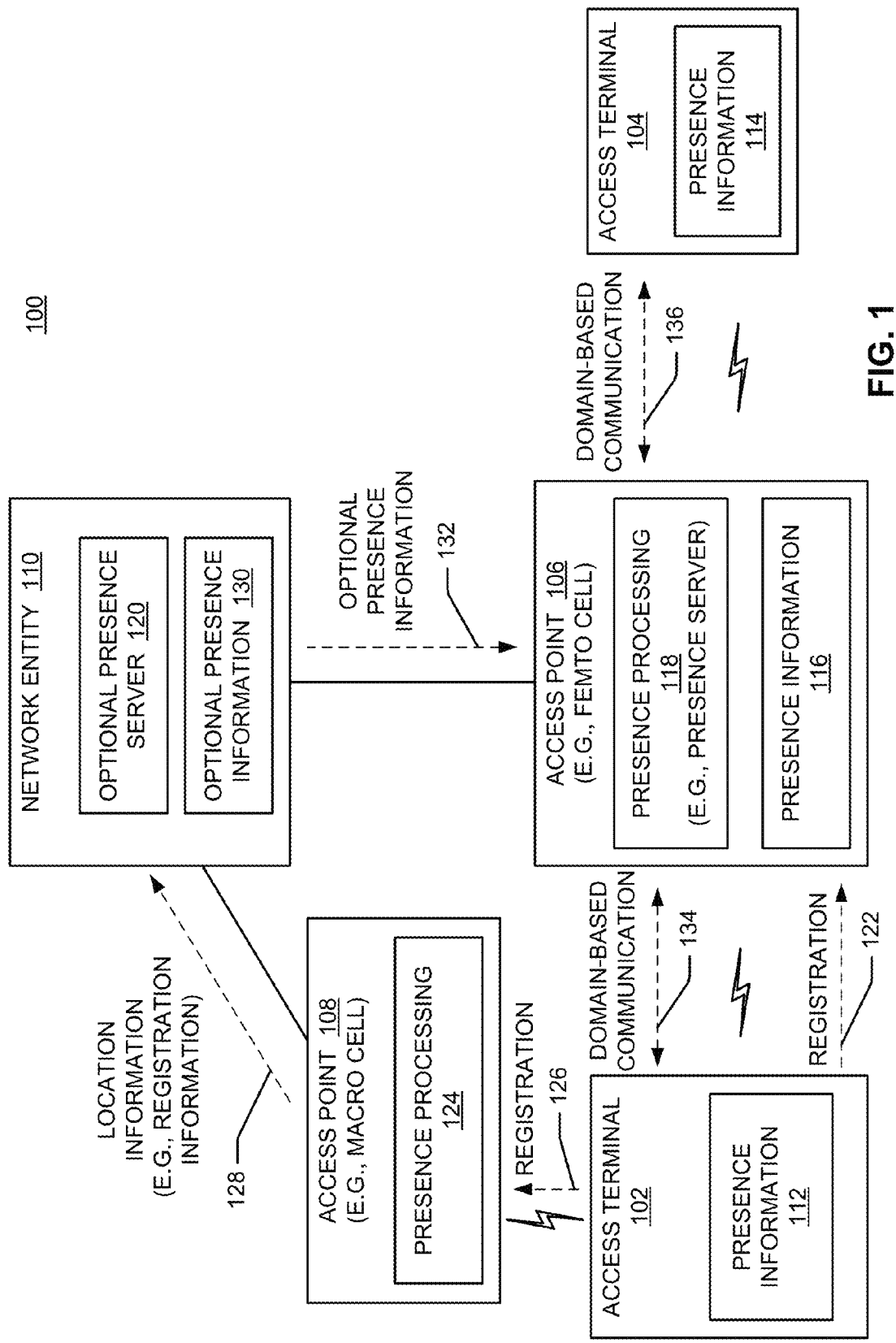
FIG. 1 is a simplified block diagram illustrating several sample aspects of an embodiment of a communication system that provides presence-based communication.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, femto cells, and so on, while access terminals may be referred to or implemented as user equipment (UEs), mobile stations, users, handsets, and so on.

Access points in the system 100 provide access to one or more services (e.g., network connectivity) for one or more wireless terminals (e.g., the access terminals 102 and 104) that may be installed within or that may roam throughout a coverage area of the system 100. For example, at various points in time the access terminal 102 may connect to the access point 106, the access point 108, or some access point in the system 100 (not shown). Each of these access points may communicate with one or more network entities (represented, for convenience, by the network entity 110) to facilitate wide area network connectivity.

Such network entities may take various forms such as, for example, one or more radio and/or core network entities. Thus, in various implementations a network entity may represent functionality such as at least one of: network management (e.g., via an operation, administration, management, and provisioning entity, commonly referred to as an OAM), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals. Also, two or more network entities may be co-located and/or two or more network entities may be distributed throughout a network.

The access terminals 102 and 104 and, optionally, one or more other access terminals (not shown) are associated with a presence domain that includes the access point 106 (e.g., a femto cell) and, optionally, one or more other access points (not shown). In practice a given access terminal may be associated with one or more presence domains and a given access point may be associated with one or more presence domains. For purposes of illustration, the discussions that follow primarily describe scenarios involving a single presence domain. It should be appreciated, however, that the disclosed concepts are applicable to scenarios that employ multiple presence domains.

Presence-based communication is enabled for an access terminal associated with the presence domain if that access terminal is at the presence domain. In a typical implementation, presence is predicated on whether the access terminal is able to communicate with an access point of the presence domain.

In some implementations, presence-based synchronous communication is provided for access terminals present at the presence domain. For example, after observing presence information presented (e.g., displayed) by their respective access terminals, two users in the coverage of a femto cell may elect to establish intercom-like communication using the femto cell(s) of the presence domain. Here, the femto cell(s) of the presence domain may use presence information to determine whether all of the users wishing to participate in a communication session are at the presence domain. If so, the femto cell(s) may directly route the traffic (e.g., voice services, data services, messaging services) between the users without routing the traffic to core network elements over the backhaul. In this case, the femto cell(s) and the core network may still exchange signaling information for authentication, authorization, or other purposes. To enable routing traffic in this manner, each femto cell of the presence domain may include functionality to connect the communicating end points directly without any need for transcoding.

In some implementations, presence-based asynchronous communication is provided for access terminals present at the presence domain. Here, certain types of communication are defined that are relevant only in the coverage of a femto cell. Examples of these types of communication include reminders for family members when they are at home, routine status messages from home automation devices when a home owner enters the home, information used by an employee at work, and so on. This communication is defined to be used in conjunction with (e.g., the information is sent with) a delivery tag that identifies a location (e.g., a presence domain) where the communication should be delivered to a given user or users (e.g., to the access terminal(s) of the user(s)). When the recipient is not present at the designated location (e.g., the presence domain), a femto cell, a core network entity, or some other suitable entity caches the information to be communicated. Then, when the user enters the designated location, the caching entity determines that this has occurred and delivers the information to the user.

To facilitate presence-based communication, the entities associated with the presence domain maintain and exchange presence information that indicates which access terminals are present at the presence domain. In FIG. 1, the access terminal 102, the access terminal 104, and the access point 106 maintain presence information 112, 114, and 116, respectively. Similar presence information is maintained by any other access terminals and access points associated with the presence domain. Through the use of such presence information, each of these entities is able identify the access terminals that are able to communicate at the presence domain. This presence information may thus be used by users, access terminals, and access points associated with the presence domain to enable more efficient communication (e.g., the synchronous and/or asynchronous communication discussed above).

In some implementations, a presence server is employed for a presence domain whereby the presence server manages the distribution of presence information for the entities associated with the presence domain. Here, whenever an entity acquires new (e.g., changed) presence-related information, that entity sends the information to the presence server and the presence server updates the presence information at the entities of the presence domain.

A presence server may be implemented at various entities in the system 100. In some cases, a presence server is implemented at an access point of the presence domain. FIG. 1 illustrates an example where the access point 106 includes presence processing 118 that establishes presence-based communication for associated access terminals and optionally provides presence server functionality. In some cases, a presence server is implemented at a core network entity. For example, the network entity 110 of FIG. 1 optionally includes a presence server 120.

In some implementations, changes in presence status are identified based on where an access terminal registers in the system 100. For example, in a typical implementation, registration of an access terminal at a femto cell of the presence domain indicates that the access terminal is present at the presence domain. Conversely, registration of the access terminal at some other access point (e.g., a macro cell) may indicate that the access terminal is not present at the presence domain.

In a scenario where the access terminal 102 registers at the access point 106 (as represented by the dashed line 122), the presence processing 118 updates the presence information 116 to indicate that the access terminal 102 is now in the presence domain that includes the access point 106. In conjunction with updating the presence information 116, the presence processing 118 may send presence information to other entities of the presence domain (e.g., the access terminal 104) to inform them of the change in presence for the access terminal 102.

In FIG. 1, the access point 108 (e.g., a macro cell) includes presence processing 124 that provides presence-related information to entities associated with any presence domains that are defined in the system 100. Here, it should be appreciated that in some cases the access terminal 102 may not inform the access point 106 that the access terminal 102 is leaving the coverage of the access point 106. Accordingly, the presence processing 124 may provide information that is used to inform the presence domain entities that the access terminal 102 has left the presence domain. As represented by the dashed line 126, at some point in time, the access point 108 receives a registration message from the access terminal 102. As represented by the dashed line 128, as a result of receiving this registration message, the presence processing 124 sends location information (e.g., registration information) to a presence server for the presence domain with which the access terminal 102 is associated. In the example of FIG. 1, this presence domain is also associated with the access point 106.

In an implementation where the presence server for the presence domain is deployed in the network entity 110 (e.g., within the cellular core network), the location information 128 is sent to the presence server 120. The presence server 120 also will receive presence-related information from other entities in the system 100 (e.g., regarding registrations of other access terminals associated with the presence domain). Accordingly, the presence server 120 will maintain presence information 130 that keeps track of which access terminals are present at the presence domain. The presence server 120 also sends presence information to other entities of the presence domain (e.g., as represented by the dashed line 132) so that all of these entities will have up-to-date presence information.

In an implementation where a presence server is deployed at the access point 106 (e.g., as presence processing 118) instead of at the network entity 110, the location information 128 is forwarded by the network entity 110 to this presence server (e.g., as represented by the dashed line 132). In a similar manner as discussed above, the presence processing 118 will receive presence-related information from other entities in the system 100 and thereby maintain the presence information 116 to keep track of which access terminals are present at the presence domain. Also, the presence processing 118 sends presence information to other entities of the presence domain (e.g., the femto cells and access terminals associated with the presence domain).

Sample operations relating to maintaining presence information and enabling and disabling presence-based communication will now be described in more detail in conjunction with the flowchart of FIGS. 2 and 3. For purposes of illustration, these operations are described in the context of a system that employs a presence server that keeps track of whether each access terminal associated with a presence domain is present at the presence domain. For example, a presence server may receive access terminal registration information from access points in a system, use that registration information to determine whether or not the access terminals are present at the presence domain and update the presence information stored by the presence server accordingly, then send the updated presence information to all of the members (e.g., access terminals and access points) of the presence domain. In this way, all of the presence domain members will be kept informed as to the current status of the member access terminals. It should be appreciated, however, that the teachings herein are also applicable to implementations that do not employ a centralized presence server for managing presence-related information. For example, in some implementations, all of the entities of a presence domain may cooperate to share any presence-related information learned by any one of these entities.

Figure 2:
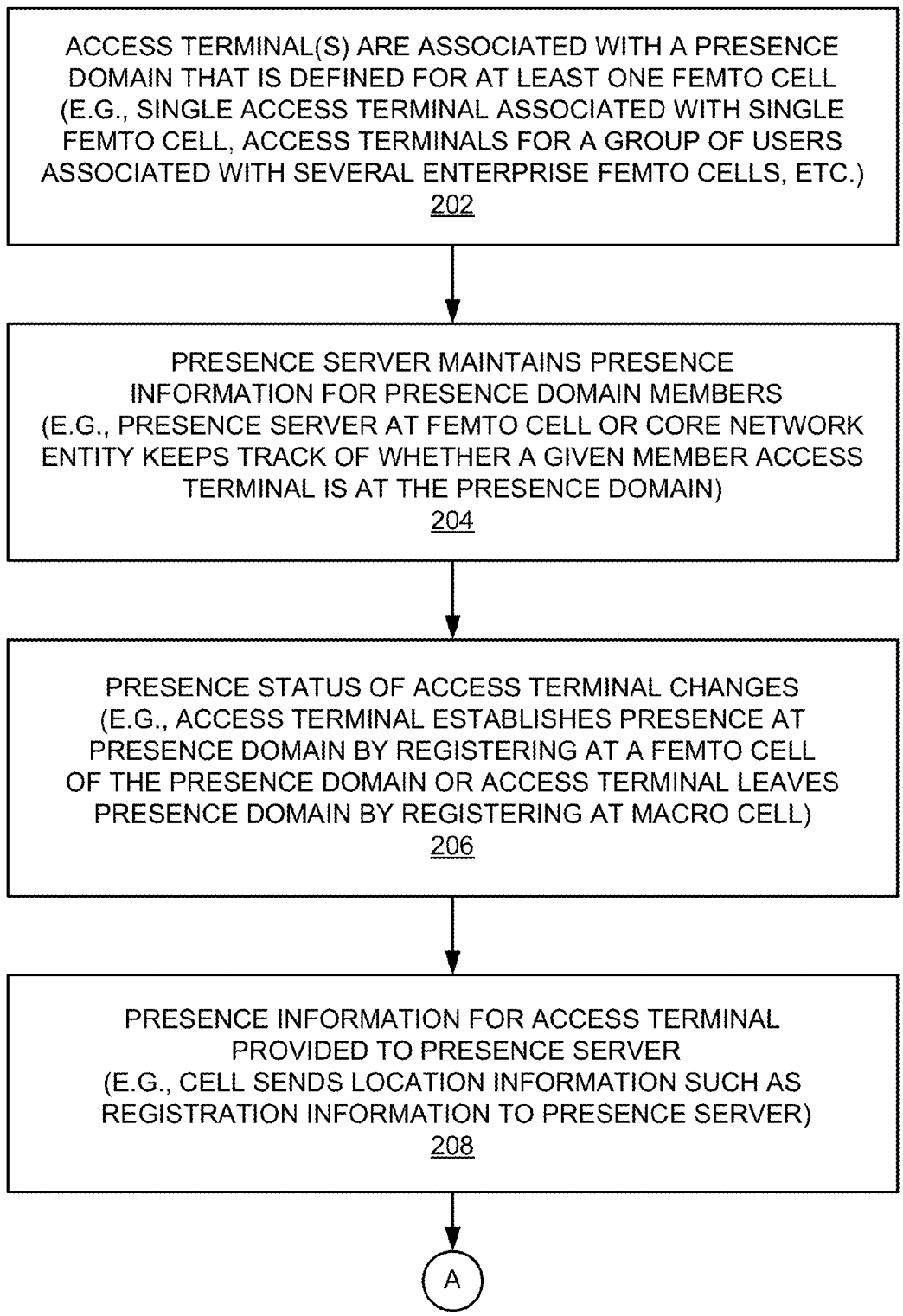
FIGS. 2 and 3 are a flowchart illustrating several sample aspects of an embodiment of presence-based communication operations.
Figure 3:
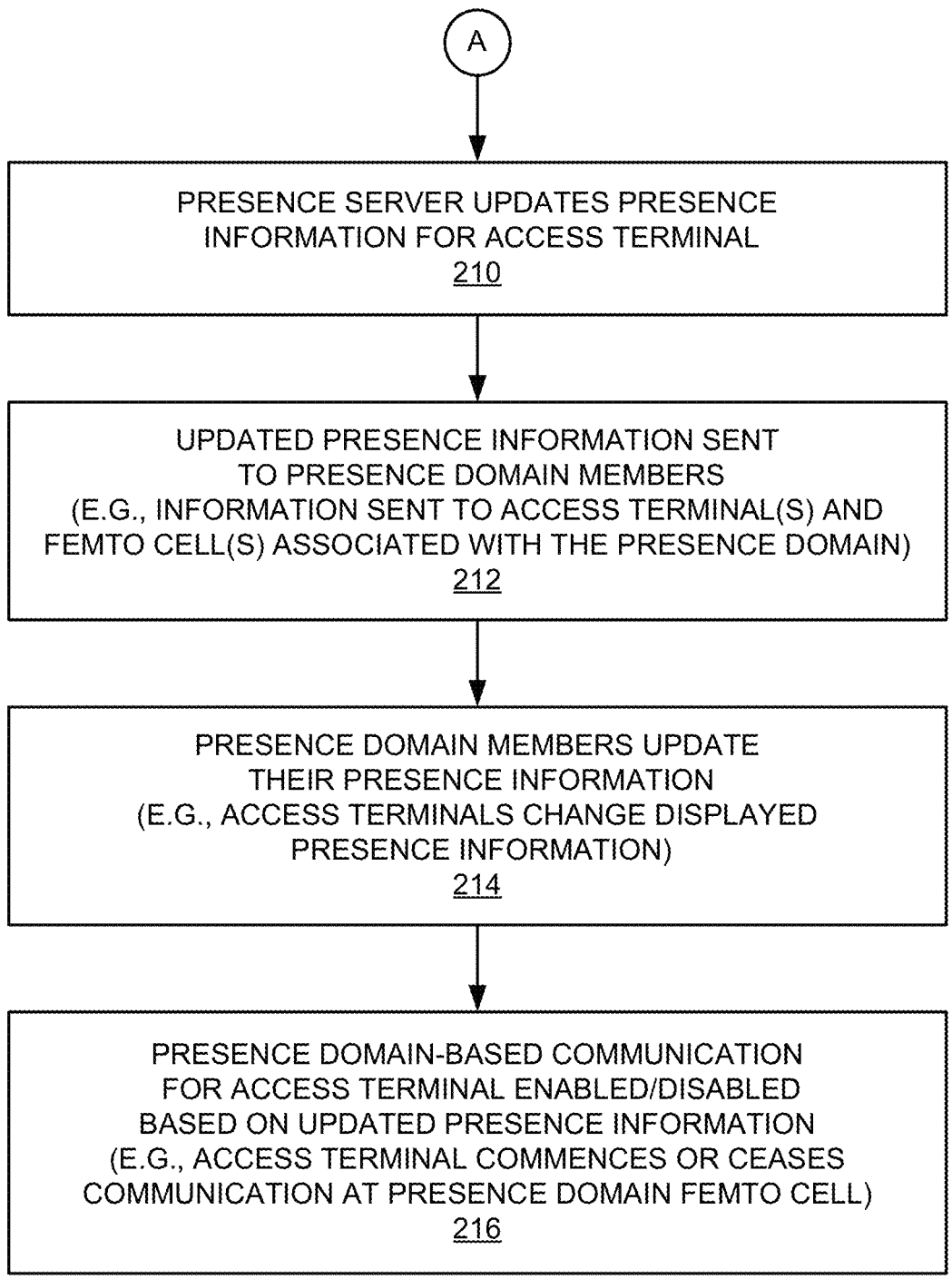

For convenience, the operations of FIGS. 2 and 3 (or any other operations discussed or taught herein) may be described as being performed by specific components (e.g., components of FIG. 1, 4, 8, or 11). It should be appreciated, however, that these operations may be performed by other types of components and may be performed using a different number of components. It also should be appreciated that one or more of the operations described herein may not be employed in a given implementation.

As represented by block 202 of FIG. 2, at some point in time, one or more access terminals (e.g., user devices) are associated with a presence domain that is defined for one or more access points. Thus, in some cases, the operations of block 202 involve associating a single access terminal with a single femto cell. In some cases, the operations of block 202 involve associating a single access terminal with a defined set of several femto cells (e.g., femto cells deployed for a common entity such as an enterprise, a business, a school, a shopping center, an airport, and so on). In some cases, the operations of block 202 involve associating several access terminals (e.g., access terminals associated with a defined group of people such as employees, members of a family, students, and so on). In some cases, the operations of block 202 involve associating several access terminals with a defined set of several femto cells.

In conjunction with being associated with a presence domain, a user may control whether his or her presence information is available to other members of the presence domain (e.g., other members of a user group). For example, one or more permission variables may be set at this point, whereby the variables specify the users to which the presence information is allowed to be sent.

As represented by block 204, a presence server maintains presence information for the members of the presence domain. This presence information indicates, for each access terminal that is associated with the presence domain, whether that access terminal is present at the presence domain. As used herein, presence of an access terminal at a presence domain means that the access terminal is available to communicate at the presence domain. Hence, the presence of the access terminal also provides some indication of the location of the access terminal (e.g., near a particular access point).

The presence information may take various forms. In some cases, the presence information simply comprises an indication of whether or not a given access terminal is present at the presence domain. In some cases, the presence information identifies a physical location of an access terminal (e.g., the current geographic coordinates of the access terminal, an identifier of the access point (e.g., cell) with which the access terminal is communicating). In some cases, the presence information identifies a logical location of an access terminal (e.g., whether the access terminal is at a user's home or work site). In some cases, the presence information indicates whether the access terminal is in communication with an access point (e.g., a femto cell) of a set of one or more access points associated with the presence domain. In some cases, the presence information indicates whether the access terminal is in communication with an access point (e.g., a macro cell) that is not associated with the presence domain.

The presence server may be implemented in various ways. In a typical implementation, a presence server comprises functionality that optionally receives presence-related information (e.g., a location of an access terminal) from other entities, maintains this received information or other presence-related information (e.g., derived from received information) in a data memory (e.g., a database), and optionally sends presence-related information to other entities. In a typical case, the presence server is implemented at a network entity (e.g., an access point, a core network entity) that provides other network functionality. In other cases, the presence server is implemented as a stand-alone processing entity.

As mentioned above, a presence server may be deployed at various locations. In some implementations, a presence server is implemented at an access point. For example, when a single access point is associated with a presence domain, the presence server may be implemented at that access point. As another example, when a set of access points is associated with a presence domain, the presence server may be implemented at one or more of those access points. In some implementations, a presence server is implemented at a core network entity. For example, a presence server may be implemented at a femto cell management server (FMS), at a femto cell gateway (FGW), at an OAM, and so on.

As represented by block 206, at some point in time, the presence status of an access terminal changes. For example, the access terminal may establish presence at a presence domain or leave the presence domain.

This change in status may be indicated in various ways. In some cases, a change in status is indicated by registration of the access terminal. For example, the establishment of presence may be indicated by an access terminal registering at an access point (e.g., a femto cell) that is a member of the presence domain as the access terminal enters the coverage of that access point. Conversely, the end of presence may be indicated by an access terminal registering at an access point (e.g., a macro cell) that is not a member of the presence domain as the access terminal leaves the coverage of an access point that is a member of the presence domain.

As represented by block 208, as a result of the change in presence status for the access terminal at block 206, presence information for the access terminal is provided to the presence server. In a typical case, an access point in communication with the access terminal sends location information (e.g., registration information) regarding the access terminal to the presence server. For example, in response to the access terminal registering at the access point (e.g., a femto cell or a macro cell), the access point may send registration information to the presence server, whereby the registration information provides an indication of where the access terminal registered (e.g., as indicated by an identifier associated with the cell).

As represented by block 210 of FIG. 3, upon receiving the information regarding the change in presence status of the access terminal, the presence server updates the presence information for that access terminal. For example, as discussed above, the presence server may set an indication that specifies whether or not the access terminal is present at the presence domain or modify some other type of information maintained by (e.g., at) the presence server.

As represented by block 212, the presence server sends the updated presence information to the members of the presence domain. For example, the presence server may send the presence information to each access terminal and access point associated with the presence domain. The presence information sent here may take various forms. In some cases, the presence information takes an incremental form (e.g., only changes in presence status are conveyed). In some cases, all of the presence information is sent (e.g., indicating the current presence status of all access terminals associated with the presence domain).

As represented by block 214, the members of the presence domain update their respective locally maintained presence information based on the presence information received from the presence server. For example, an access terminal that displays presence information on a display device will change the displayed information to indicate that the designated access terminal is now present at the presence domain or that the access terminal is no longer present at the presence domain. As another example, an access point may update information it maintains (e.g., in a database) that indicates which access terminals are available for presence-based communication.

As represented by block 216, presence domain-based communication for the access terminal may then be enabled or disabled based on the updated presence information. In various implementations, this communication may comprise synchronous communication or asynchronous communication as discussed herein.

For example, upon determining that a certain access terminal is present at the presence domain, another access terminal that is present at the presence domain may initiate presence-based communication with the access terminal (e.g., autonomously or by action of a user). Conversely, upon determining that a certain access terminal is no longer present at the presence domain, another access terminal that is present at the presence domain may terminate presence-based communication with the access terminal (e.g., autonomously or by action of a user).

Also, upon determining that multiple access terminals are present at the presence domain, an access point may enable domain-based communication between these access terminals. Conversely, upon determining that an access terminal is no longer present at the presence domain, the access point may disable the domain-based communication for that access terminal. This domain-based communication may advantageously be set up so that the traffic between the access terminals is not routed through the core network. Also, in some cases, the communication between the access terminals is established via an alternative (e.g., non-cellular) access technology. The above example is discussed in more detail below in conjunction with FIGS. 4-7.

As another example, upon determining that a certain access terminal is present at the presence domain, another entity (e.g., an access point or some other network entity) may deliver previously cached information to that access terminal. This example is discussed in more detail below in conjunction with FIGS. 8-10.

Figure 4:
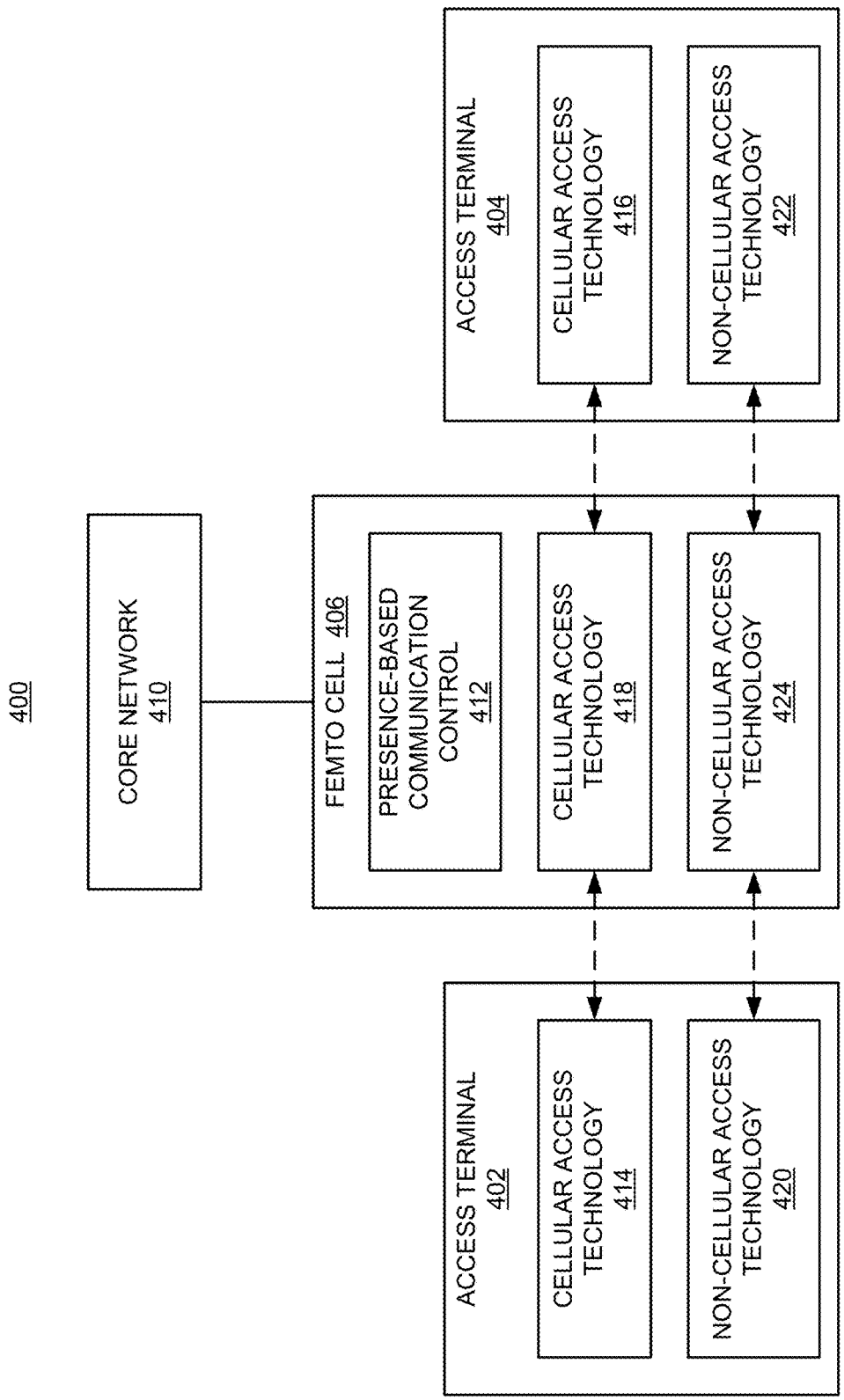
FIG. 4 is a simplified block diagram illustrating several sample aspects of a communication system that supports communication between access terminals at a presence domain.

Referring to FIG. 4, this diagram illustrates an example of a system 400 where a femto cell 406 of a presence domain establishes communication between an access terminal 402 and an access terminal 404 when both of these access terminals are present at the presence domain. For example, presence-based communication control 412 of the femto cell 406 may monitor presence information (not shown in FIG. 4) for the presence domain to determine which member access terminals are currently present at the presence domain. Once multiple access terminals are present, presence-based communication may be established (e.g., as a result of a request from one or more of the access terminals) between the access terminals.

Advantageously, the traffic for this communication (represented by the dashed lines in FIG. 4) may travel directly between the access terminals 402 and 404 via the femto cell 406 (and, optionally, other femto cells of the presence domain). That is, the traffic is not routed over the network backhaul to core network entities (e.g., represented by the core network 410). Consequently, core network traffic is reduced is this scenario as compared to a scenario where the femto cell 406 routes all traffic from all served access terminals to the core network. In a typical implementation, the femto cell 406 and the core network 410 may still exchange signaling information for authentication and authorization of access terminals.

In some implementations, the femto cell 406 (e.g., the presence-based communication control 412) selects an alternative (e.g., non-cellular) access technology for the presence-based communication. Here, the access terminal 402, the access terminal 404, and the femto cell 406 include cellular access technology 414, 416, and 418, respectively, for supporting conventional cellular service. In addition, the access terminal 402, the access terminal 404, and the femto cell 406 include non-cellular access technology 420, 422, and 424, respectively, for supporting non-cellular service.

Examples of alternative access technology include wireless LAN (WLAN) technology, Ethernet technology, and power line communication technology. In a scenario where the femto cell 406 includes a WLAN access point (e.g., base station) and the access terminals 402 and 404 include WLAN transceivers, the femto cell 406 may route traffic between the access terminals 402 and 404 via WLAN signaling upon determining that these access terminals have connected to the WLAN. In a scenario where the femto cell 406 includes an Ethernet access point for an Ethernet LAN (or the femto cell 406 is otherwise connected to the Ethernet LAN) and the access terminals 402 and 404 include Ethernet transceivers (e.g., the access terminals 402 and 404 are portable computers), the femto cell 406 may route traffic between the access terminals 402 and 404 via Ethernet signaling upon determining that these access terminals have connected to that Ethernet LAN. In a scenario where the femto cell 406 and the access terminals 402 and 404 include power line-based transceivers (e.g., where the access terminals 402 and 404 are capable of being plugged into AC power), the femto cell 406 may route traffic between the access terminals 402 and 404 via power line signaling upon determining that these access terminals have connected to a common power line.

Figure 5:
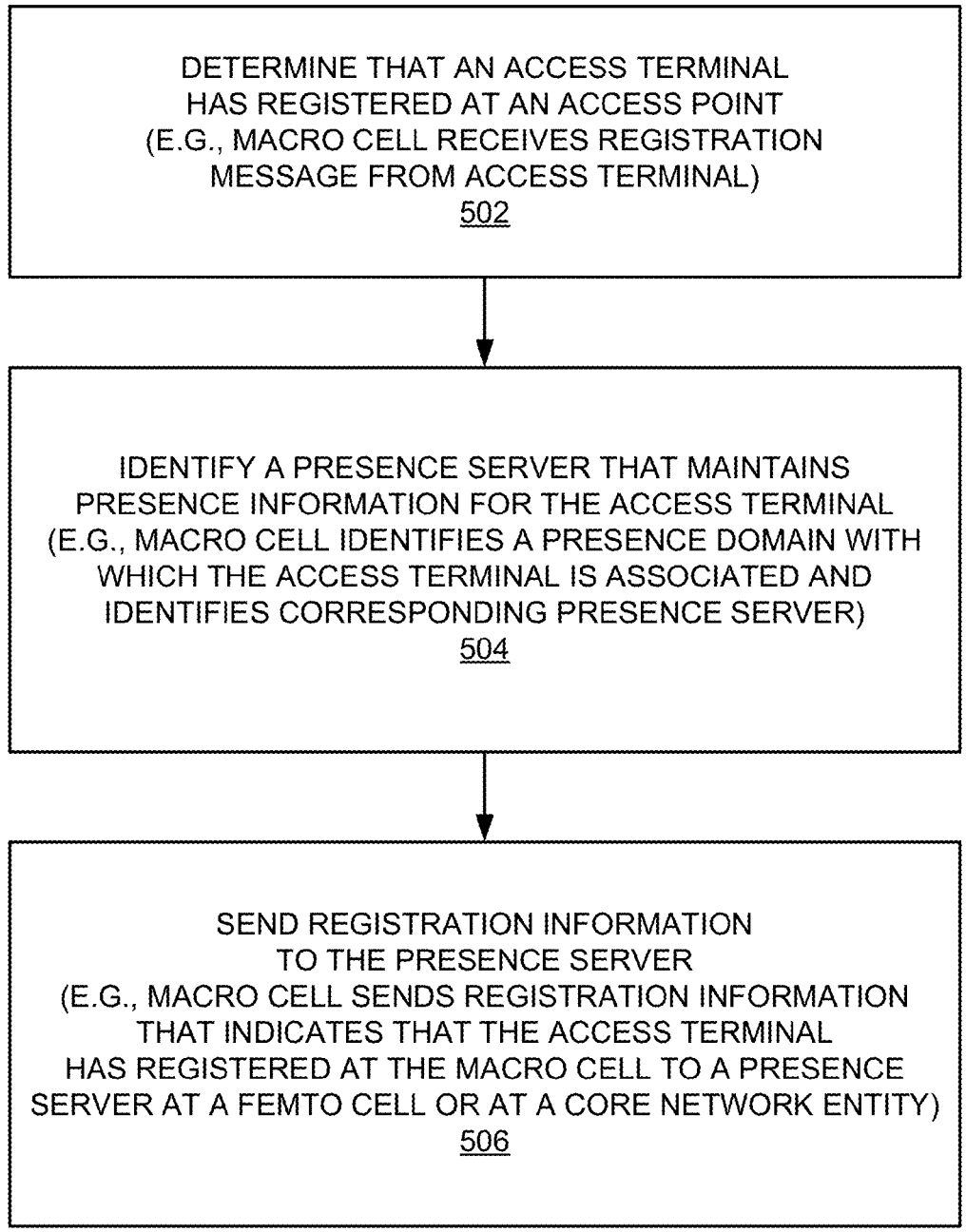
FIG. 5 is a flowchart illustrating several sample aspects of an embodiment of operations relating to providing presence-related information.
Figure 6:
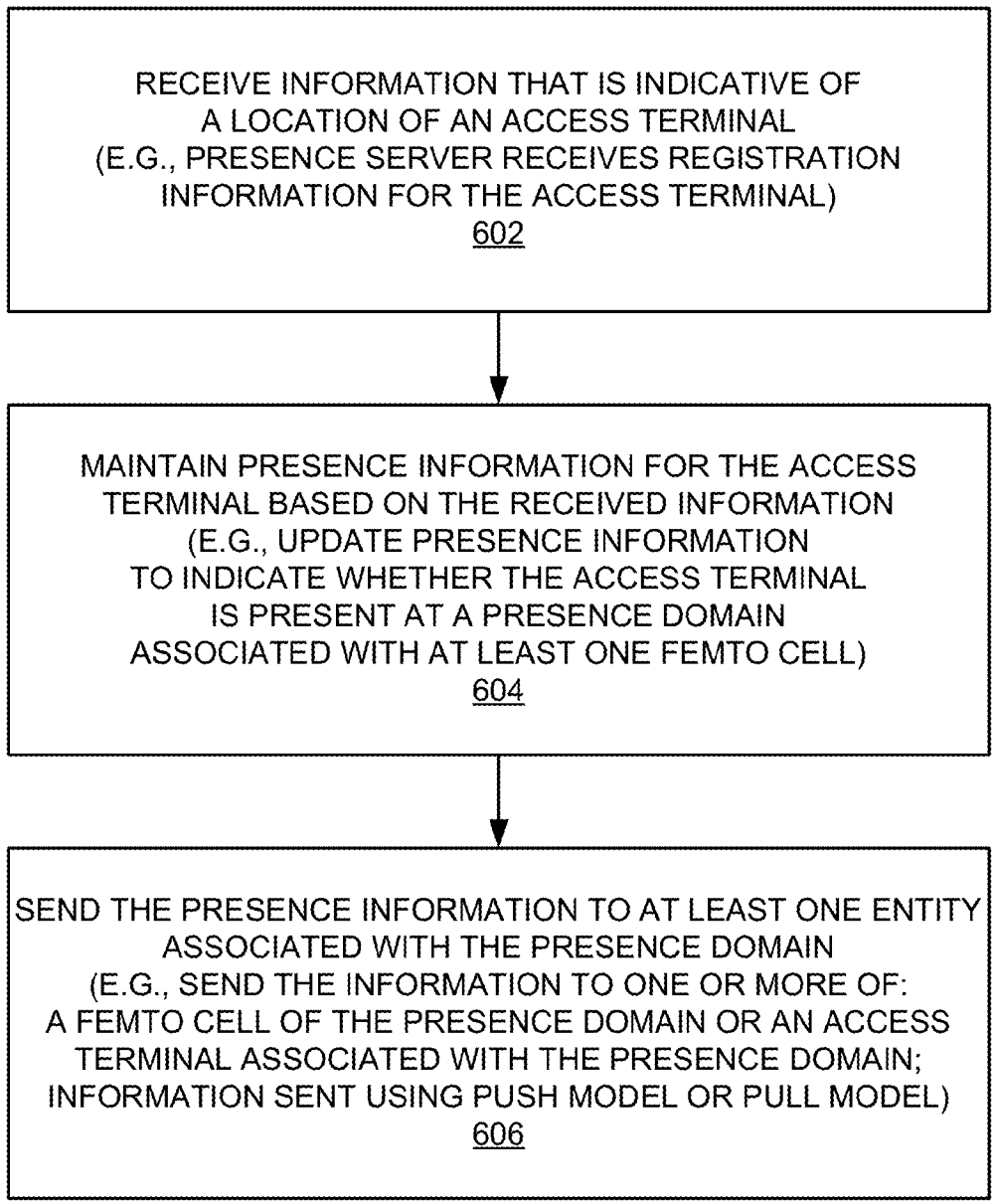
FIG. 6 is a flowchart illustrating several sample aspects of an embodiment of operations relating to maintaining presence-related information.
Figure 7:
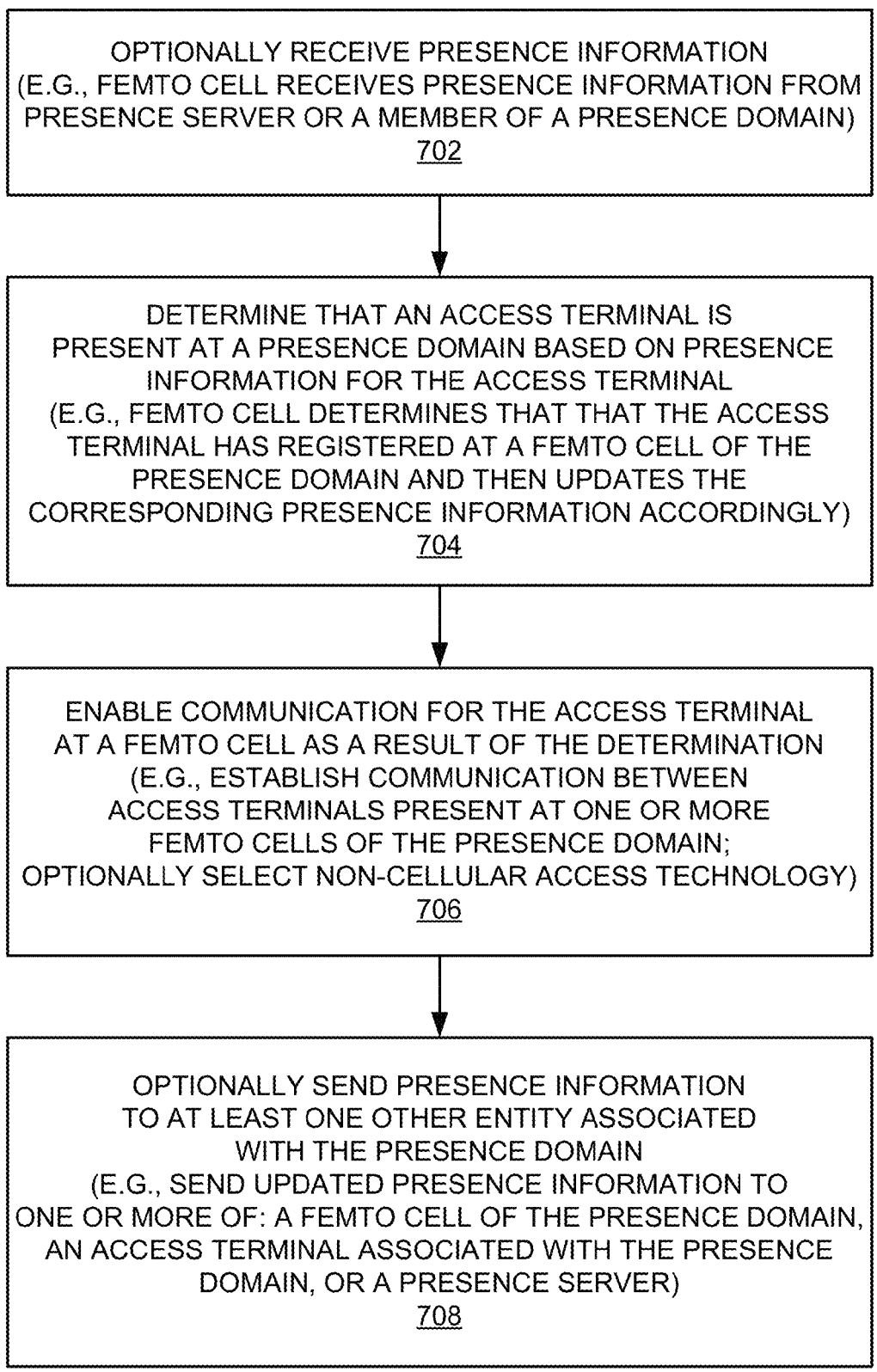
FIG. 7 is a flowchart illustrating several sample aspects of an embodiment of operations relating to enabling communication based on access terminal presence.

FIGS. 5-7 illustrate sample operations that may be perform to provide the presence-based communication of FIG. 4 or other similar communication. For purposes of illustration, the operations of FIGS. 5-7 respectively describe scenarios where a network entity (e.g., a macro cell) sends registration information to a presence server, a presence server sends presence information to a presence domain entity, and an access point (e.g., a femto cell) enables communication for an access terminal as a result of determining that the access terminal is present at a presence domain. It should be appreciated, however, that other entities and other types of information may be employed in other scenarios to provide similar functionality in accordance with the teachings herein.

Referring initially to FIG. 5, this flowchart illustrates sample operations that may be performed by a network entity (e.g., a macro access point of a cellular network) that sends information to a presence server as a result of determining that an access terminal registered with an access point. Similar operations may be employed in alternative scenarios that are based on other ways of determining whether an access terminal is present at a presence domain associated with a set of one or more access points (e.g., femto cells). For example, a determination that an access terminal is present at a presence domain may be based on some other type of communication from the access terminal or some other type of communication that is indicative of the location of the access terminal.

As represented by block 502, at some point in time, a determination is made that an access terminal is at (e.g., has registered at) an access point. For example, a macro cell may receive a registration message from the access terminal in conjunction with the access terminal registering at the access point, or the macro cell may receive some other suitable over-the-air message from the access terminal. As another example, some other network entity (e.g., a FMS, etc.) may receive a message from the access point that indicates that the access terminal has registered at the access point. As yet another example, the access terminal may register at a femto cell that is not associated with a presence domain of interest. As still another example, the access terminal may register at a femto cell that is associated with a presence domain of interest but that does not include a presence server.

As represented by block 504, as a result of the determination of block 502, a presence server that maintains presence information for the access terminal is identified. For example, a macro cell at which the access terminal registered may identify a presence domain with which that access terminal is associated and, based on this information, identify the corresponding presence server (e.g., obtain an identifier or address of the server) that maintains presence information that indicates whether the access terminal is present at a presence domain defined for a femto cell set (i.e., a set of at least one femto cell). This information may be obtained, for example, from the subscriber information for the access terminal (e.g., user) that is maintained by the network. As discussed herein, the presence server may be embodied in (e.g., implemented in) a cellular core network entity or embodied in a femto cell of the femto cell set for the presence domain.

As represented by block 506, registration information or other suitable information is then sent to the identified presence server. For example, a macro cell of a macro access point at which the access terminal registered may send registration information that indicates that the access terminal has registered at that macro access point. In general, this information includes an identifier of the access terminal and an identifier of the access point.

Referring now to FIG. 6, this flowchart illustrates sample operations that may be performed by a presence server or some other suitable entity. As discussed herein, operations such as these are typically performed by a femto cell of a presence domain or by a core network entity. In the example of FIG. 6, presence information is maintained based on received location information (e.g., registration information) relating to an access terminal. Similar operations may be employed in alternative scenarios that are based on other types of presence-related information.

As represented by block 602, a presence server (or other suitable entity) receives information that is indicative of a location of an access terminal. For example, the presence server may receive the registration information described above at block 506. Thus, the received information may identify an access point (e.g., a femto cell of the femto cell set for the presence domain) at which the access terminal has registered. In various implementations, the presence server may receive presence-related information in any one of the forms described above at block 204.

As represented by block 604, the presence server (or other entity) maintains presence information for the access terminal based on the information received at block 602. For example, presence information maintained by the presence server may be updated to indicate whether the access terminal is present at the presence domain defined for a given femto cell set.

As represented by block 606, the presence server (or other entity) sends the presence information to at least one entity associated with the presence domain. For example, updated presence information may be sent to each femto cell of the femto cell set for the presence domain. In addition, or in the alternative, updated presence information may be sent to each access terminal associated with the presence domain (e.g., including the access terminal for which the location information was received at block 602). In some implementations, these access terminals comprise a set of access terminals that are assigned to a group of users associated with the presence domain.

The operations of block 606 may be performed based on a push model or a pull model. In the former case, the presence information is sent, for example, as a result of a change in the maintained presence information. In the latter case, the presence information is sent, for example, as a result of receiving a request for the presence information from the at least one entity.

Referring to FIG. 7, this flowchart illustrates sample operations that may be performed by an access point that enables communication for an access terminal upon determining that the access terminal is at a presence domain. In a typical implementation, these operations are performed by a femto cell of the presence domain. These operations may, however, be performed by other entities in other implementations.

As represented by block 702, an access point optionally receives presence information from another entity. For example, a femto cell of a presence domain that does not include a presence server (or other similar functionality) may receive presence information as discussed herein from a presence server for that presence domain. As another example, the presence information may be received from one or more other members of the presence domain (e.g., access points and/or access terminals).

As represented by block 704, at some point in time, the access point determines that an access terminal is presence at a presence domain. As discussed herein, this determination is based on presence information for the access terminal as maintained by the access point. In some cases, this presence information is obtained from another entity (e.g., as described at block 702). In some cases, this presence information is obtained based on registration of the access terminal at the access point. For example, as a result of determining that the access terminal has registered at the access point, the access point may update the presence information for the access terminal that the access point maintains.

As represented by block 706, as a result of the determination of block 704, the access point enables communication for the access terminal. This may involve, for example, establishing communication between the access terminal and another access terminal that is present at the presence domain. As discussed above, in some cases, the communication established between the access terminals is not routed through a cellular macro network but is instead routed via non-cellular access technology that the access point selects for the communication.

As represented by block 708, in some implementations, the access point sends presence information to at least one other entity associated with the presence domain. For example, a femto cell may send updated presence information to one or more other femto cells of the presence domain, to one or more access terminals associated with the presence domain, to a presence server for the presence domain, or to a combination of these entities.

Figure 8:
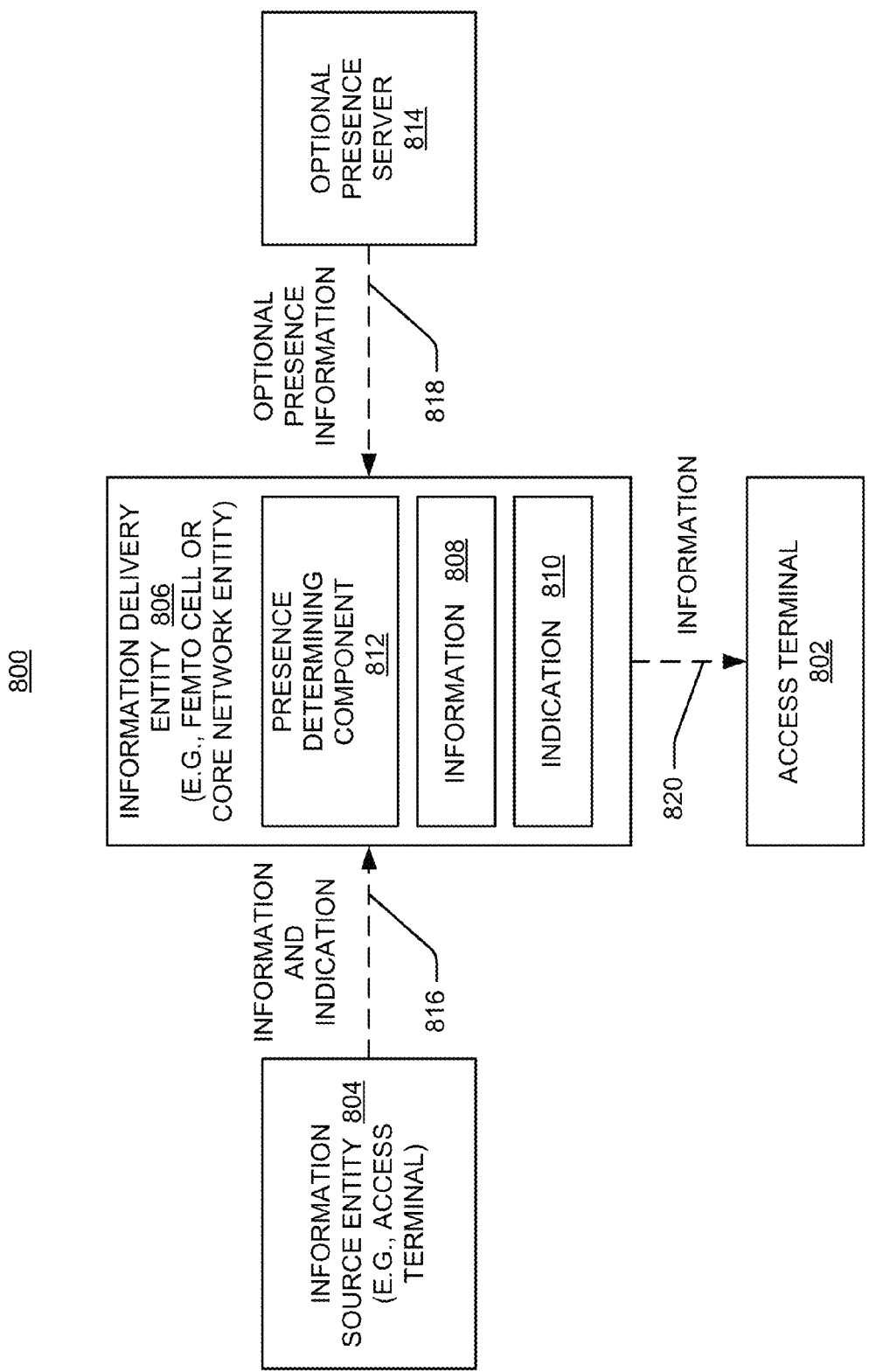
FIG. 8 is a simplified block diagram illustrating several sample aspects of a communication system that provides presence-based information delivery.
Figure 9:
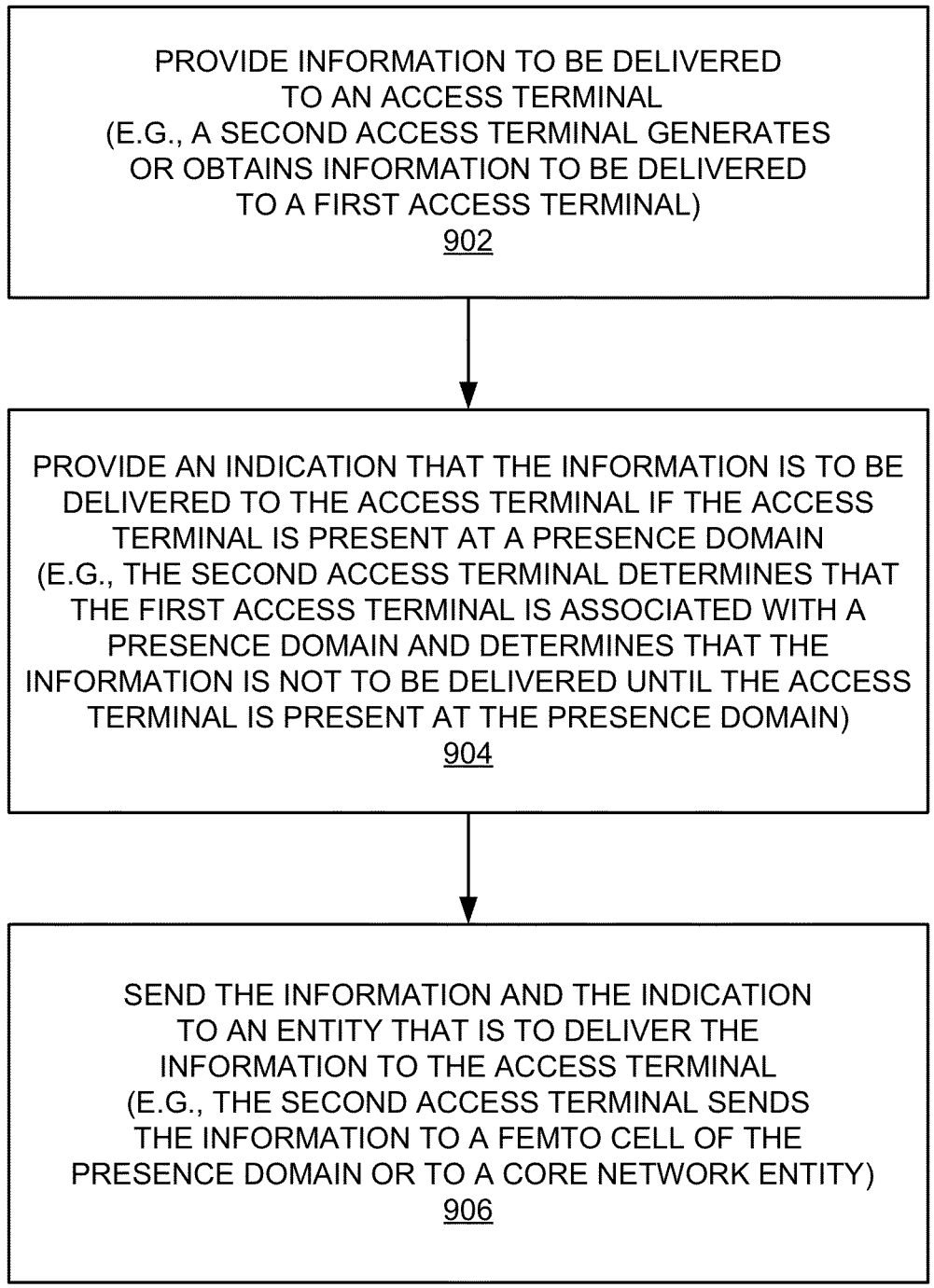
FIG. 9 is a flowchart illustrating several sample aspects of an embodiment of operations relating to providing information for presence-based delivery.
Figure 10:
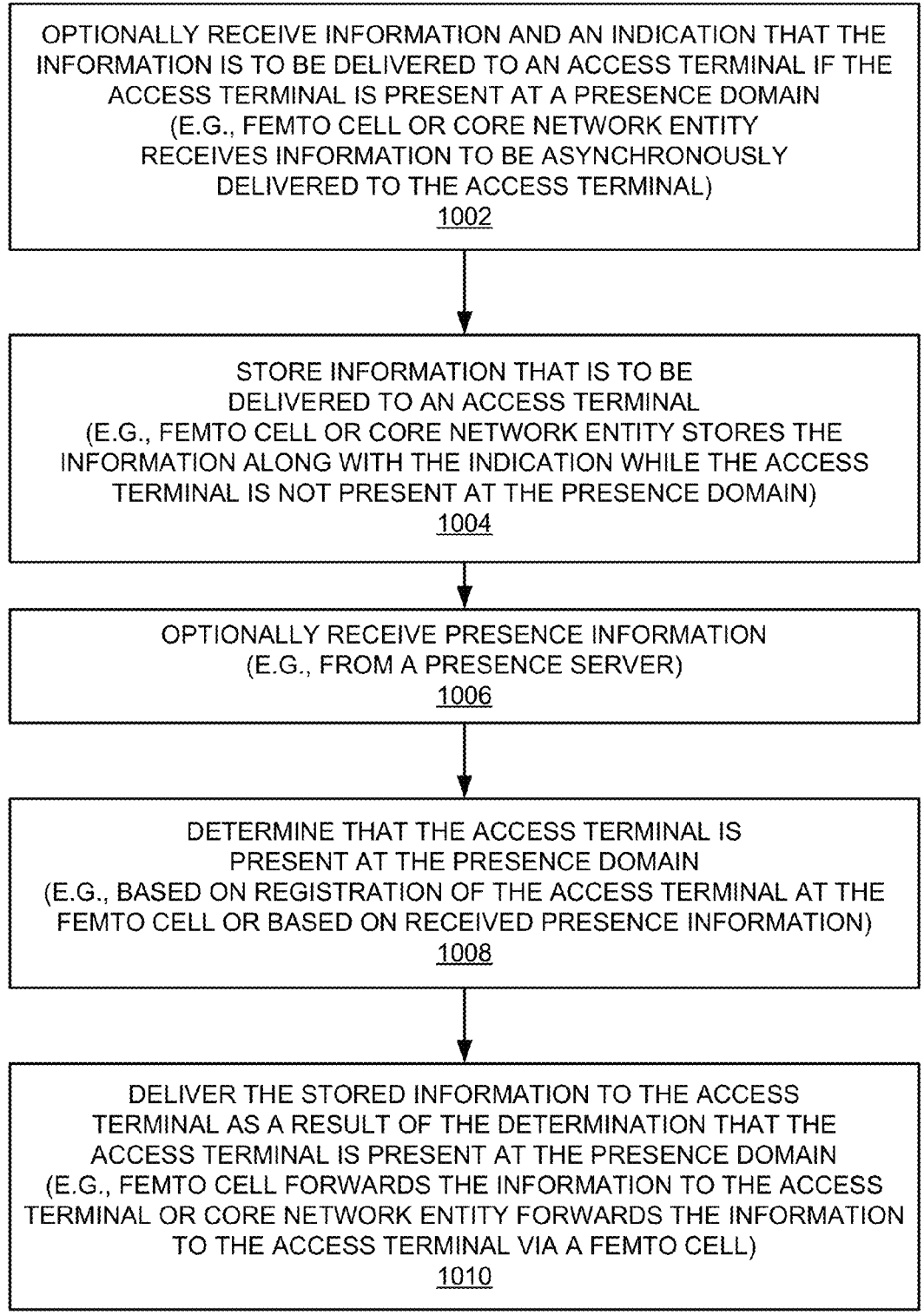
FIG. 10 is a flowchart illustrating several sample aspects of an embodiment of operations relating to delivering information based on access terminal presence.

Referring now to FIG. 8, this diagram illustrates an example of a system 800 where an information delivery entity 806 facilitates asynchronous delivery of information to an access terminal 102 (or any other access terminal of a presence domain) when that access terminal is present at the presence domain. Here, as represented by a dashed line 816, an information source entity 804 (e.g., an access terminal) provides information to be delivered to the access terminal 802 along with an indication that the information is to be delivered when the access terminal 802 is present at the presence domain. The information delivery entity 806 (e.g., a femto cell or a core network entity) stores the received information 808 and the received indication 810. As a result of receiving the information 808 with the indication 810, a presence determining component 812 monitors the presence status of the access terminal 802. This monitoring may involve, for example, monitoring locally generated presence information and/or monitoring presence information that is received from a presence server 814 as represented by a dashed line 818. Once the presence determining component 812 determines that the access terminal 802 is present at the presence domain, the information delivery entity 806 delivers the information to the access terminal 802 as represented by a dashed line 820. FIGS. 9 and 10 illustrate sample operations that may be performed to provide the presence-based communication of FIG. 8 or other similar communication.

FIG. 9 illustrates sample operations that may be performed by an information source that provides information to be delivered to an access terminal. These operations may be performed by another access terminal, an access point, a core network entity, or some other suitable entity.

As represented by block 902 of FIG. 9, the information source provides (e.g., generates or obtains) information to be delivered to an access terminal. For example, a user may generate information (e.g., using his or her access terminal) that is to be delivered to another user when the other user is at a specified presence domain (e.g., home, work, etc.). As a specific example, the information may indicate a task (e.g., a shopping list, a to-do list) that a user is to perform or be reminded of once the user returns home. As another specific example, the information may indicate tasks (e.g., the information takes the form of a time calendar) that a user is to perform at work on a given day.

As represented by block 904, the information source also provides an indication that the information is to be delivered to the access terminal if the access terminal is present at a presence domain (e.g., defined for a femto cell set). This may involve, for example, determining that the access terminal is associated with a presence domain, and determining that the information is not to be delivered to the access terminal until the access terminal is present at the presence domain (e.g., based on user input).

As represented by block 906, the information source sends the information of block 902 and the indication of block 904 to an entity that is to deliver the information to the access terminal. For example, the information source may send the information and indication to femto cell associated with the presence domain or to a core network entity.

FIG. 10 illustrates sample operations that may be performed by a delivery entity that caches information for delivery to an access terminal. These operations may be performed, for example, by a femto cell associated with a presence domain or by a core network entity.

As represented by block 1002, the delivery entity optionally receives information to be delivered to an access terminal and an indication that the information is to be delivered to the access terminal if the access terminal is present at a presence domain. For example, in a scenario where the delivery entity did not generate the information, the delivery entity receives this information and the associated indication from another entity that did generate the information.

As represented by block 1004, the delivery entity stores information that is to be delivered to the access terminal. As discussed above at block 1002, in some cases this information is received from another entity that generated the information (and, optionally, a corresponding indication). In other cases, however, the delivery entity generates the information to be delivered to the access terminal. As discussed herein, this information may be stored along with an indication that the information is to be delivered to the access terminal if the access terminal is present at the presence domain. This information (and indication, if applicable) is stored while the access terminal is not present at the presence domain.

As represented by block 1006, in some scenarios, the delivery entity receives presence information for the access terminal. For example, the delivery entity may receive presence information as discussed herein from a presence server or from a member of the presence domain.

As represented by block 1008, at some point in time, the delivery entity determines that the access terminal is present at the presence domain. This determination may be made, for example, based on registration of the access terminal at the delivery entity or based on received presence information (e.g., from block 1006).

As represented by block 1010, as a result of the determination of block 1008, the delivery entity delivers the stored information to the access terminal. For a scenario where the delivery entity is a femto cell at which the access terminal has registered (or is otherwise in communication), this operation may simply involve the femto cell forwarding the information to the access terminal. For a scenario where the delivery entity is a core network entity, this operation may involve the core network entity forwarding the information to the access terminal via a femto cell that is currently serving the access terminal. For a scenario where the delivery entity is a femto cell of the presence domain (but not one at which the access terminal has registered), this operation may involve the femto cell forwarding the information to another femto cell that is currently serving the access terminal either via the core network or via some other communication link (e.g., a direct communication link between the femto cells).

In view of the above, asynchronous content information delivery at an access terminal may be accomplished in various ways. For example, as a result of an access terminal establishing communication with (e.g., registering at) a femto cell associated with a presence domain, the access terminal will receive any information that is to be delivered to the access terminal if the access terminal is present at the presence domain. As discussed above, this information may be received from the femto cell, a presence server for the presence domain, or some other suitable entity. Also as discussed above, the access terminal may generate an indication (e.g., a visual display and/or audible signal) based on the received information. For example, the access terminal may display a home-specific message when a user enters his or her house, and the access terminal may display a work-specific message when a user enters his or her place of employment.

In some implementations, an access terminal actively downloads asynchronous content information. For example, an access terminal may determine that it is present at a presence domain upon establishing communication with a femto cell (e.g., based on the identity of the femto cell, based on presence information received upon establishing this communication, and so on). The access terminal then sends a request for any stored asynchronous content information as a result of the determination that the access terminal is present at the presence domain. For example, the access terminal may send this request to the femto cell or to a presence server for the presence domain. Thus, the access terminal may receive asynchronously delivered information as a result of sending such a request.

Figure 11:
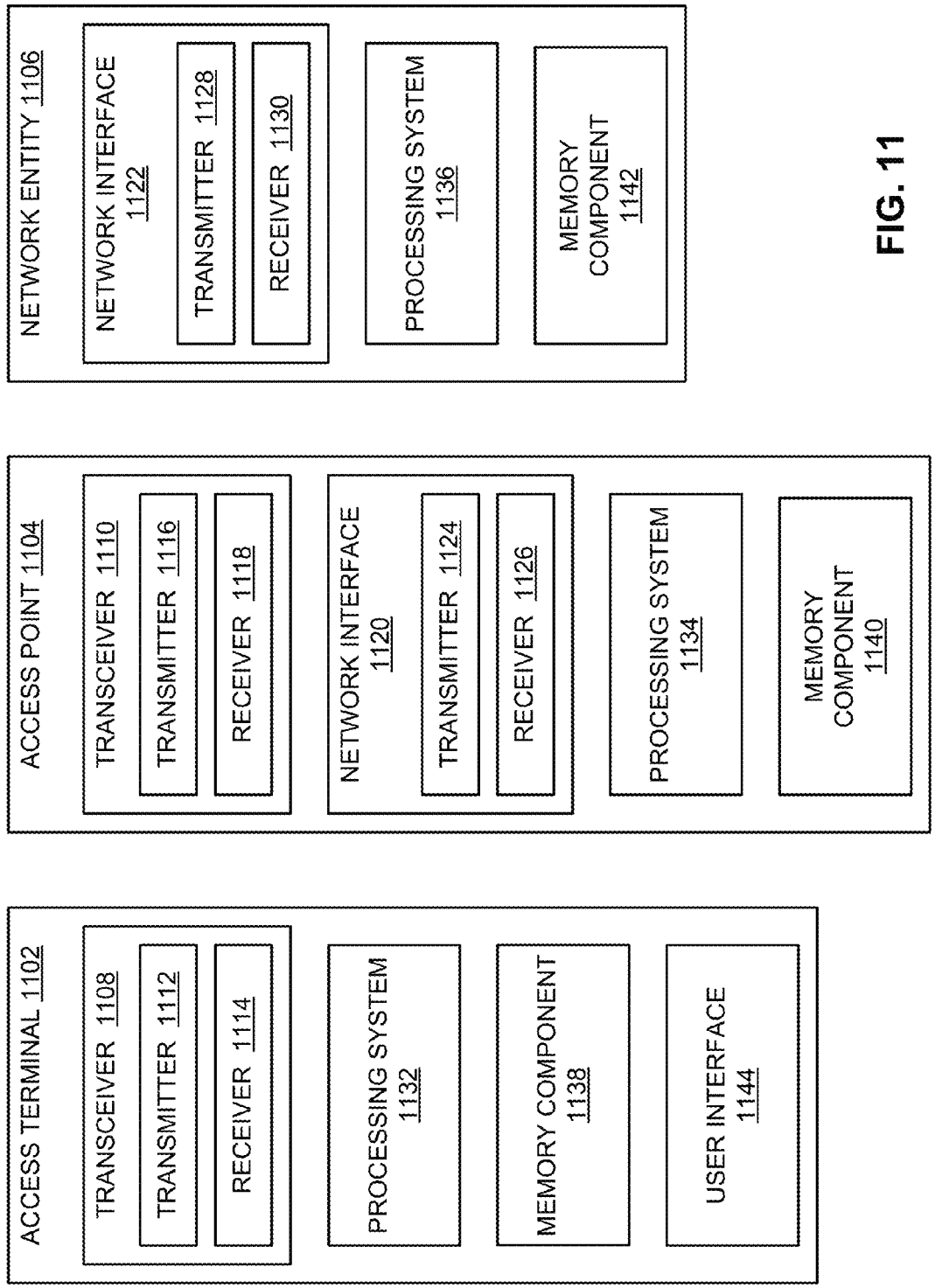
FIG. 11 is a simplified block diagram of several sample aspects of components that may be employed in communication nodes.

FIG. 11 illustrates several sample components (represented by corresponding blocks) that may be incorporated into nodes such as an access terminal 1102, an access point 1104, and a network entity 1106 (e.g., corresponding to the access terminal 102, the access point 106, and the network entity 110 (or the access point 108), respectively, of FIG. 1) to perform presence-related operations as taught herein. The described components also may be incorporated into other nodes in a communication system. For example, other nodes in a system may include components similar to those described for the access point 1104 to provide similar functionality. Also, a given node may contain one or more of the described components.

As shown in FIG. 11, the access terminal 1102 and the access point 1104 each include one or more transceivers (as represented by a transceiver 1108 and a transceiver 1110, respectively) for communicating with other nodes. Each transceiver 1108 includes a transmitter 1112 for sending signals (e.g., messages, indications, presence-related information, asynchronous content information, location-related information, registration-related information, or other information) and a receiver 1114 for receiving signals (e.g., messages, indications, and information as indicated above). Similarly, each transceiver 1110 includes a transmitter 1116 for sending signals and a receiver 1118 for receiving signals. In some cases (e.g., for cellular or WiFi communication), a transceiver supports wireless communication. In some cases (e.g., for Ethernet or power line communication), a transceiver supports wire-based communication. In some implementations, the access terminal 1102 and the access point 1104 each include multiple transceivers that enable operating on multiple carriers and/or communicating via different technologies (e.g., cellular access technology and non-cellular access technology).

The access point 1104 and the network entity 1106 each include one or more network interfaces (as represented by a network interface 1120 and a network interface 1122, respectively) for communicating with other nodes. For example, a network interface may be configured to communicate with one or more other network entities via a wire-based or wireless backhaul. In some aspects, a network interface is implemented as a transceiver comprising transmitter and receiver components (e.g., configured to support wire-based or wireless communication). Accordingly, in the example of FIG. 11, the network interface 1120 is shown as including a transmitter 1124 and a receiver 1126, while the network interface 1122 is shown as including a transmitter 1128 and a receiver 1130.

The access terminal 1102, the access point 1104, and the network entity 1106 also include other components that may be used in conjunction with presence-related operations as taught herein. For example, the access terminal 1102 includes a processing system 1132 for performing presence-related functions (e.g., providing information to be delivered to an access terminal, providing an indication that the information is to be delivered to the access terminal if the access terminal is present at a presence domain, sending the information and the indication, receiving information delivered asynchronously, establishing communication with a femto cell associated with a presence domain, determining that the access terminal is present at the presence domain based on the establishing of the communication, sending a request for information as a result of the determination wherein the information is received as a result of sending the request) and for providing other related functionality as taught herein. In some implementations, some of the described operations of the processing system 1132 may be implemented in the transceiver(s) 1108. The access point 1104 includes a processing system 1134 for performing presence-related functions (e.g., determining that an access terminal is present at a presence domain, enabling communication for the access terminal, receiving presence information, determining that the access terminal has registered, updating presence information, sending presence information, receiving information that is indicative of a location of an access terminal, maintaining presence information, determining that an access terminal has registered at an access point, identifying a presence server, sending registration information to the presence server, storing information that is to be delivered to an access terminal, determining that the access terminal is present at a presence domain, delivering the stored information to the access terminal, receiving the information and the indication, receiving presence information) and for providing other related functionality as taught herein. In some implementations, some of the described operations of the processing system 1134 may be implemented in the transceiver(s) 1110 and/or the network interface(s) 1120. The network entity 1106 includes a processing system 1136 for performing presence-related functions (e.g., receiving information that is indicative of a location of an access terminal, maintaining presence information, sending presence information, determining that an access terminal has registered at an access point, identifying a presence server, sending registration information to the presence server, storing information that is to be delivered to an access terminal, determining that the access terminal is present at a presence domain, delivering the stored information to the access terminal, receiving the information and the indication, receiving presence information) and for providing other related functionality as taught herein. In some implementations, some of the described operations of the processing system 1136 may be implemented in the network interface(s) 1122. The access terminal 1102, the access point 1104, and the network entity 1106 include memory components 1138, 1140, and 1142, respectively (e.g., each including one or more memory devices), for maintaining information (e.g., presence-related information) relating to presence-based functionality and other functionality. In some implementations, the access terminal 1102 includes a user interface 1144 for providing indications (e.g., generating audible and/or visual indications, generating an indication based on received information) to a user and/or for receiving user input (e.g., upon user actuation of a sensing device such a microphone, a camera, a keypad, and so on).

For convenience the access terminal 1102, the access point 1104, and the network entity 1106 are shown in FIG. 11 as including components that may be used in the various implementations described herein. In practice, the functionality of an illustrated component may be different in different implementations. As an example, the functionality of the block 1134 may be different in an embodiment implemented in accordance with FIG. 7 as compared to an embodiment implemented in accordance with FIG. 10.

The components of FIG. 11 may be implemented in various ways. In some implementations the components of FIG. 11 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by block 1108 and some or all of the functionality represented by blocks 1132, 1138, and 1144 may be implemented by a processor or processors of an access terminal and data memory of the access terminal (e.g., by execution of appropriate code and/or by appropriate configuration of processor components). Similarly, some of the functionality represented by block 1110 and/or block 1120 and some or all of the functionality represented by blocks 1134 and 1140 may be implemented by a processor or processors of an access point and data memory of the access point (e.g., by execution of appropriate code and/or by appropriate configuration of processor components). Also, some of the functionality represented by block 1122 and some or all of the functionality represented by blocks 1136 and 1142 may be implemented by a processor or processors of an access point and data memory of the access point (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 12:
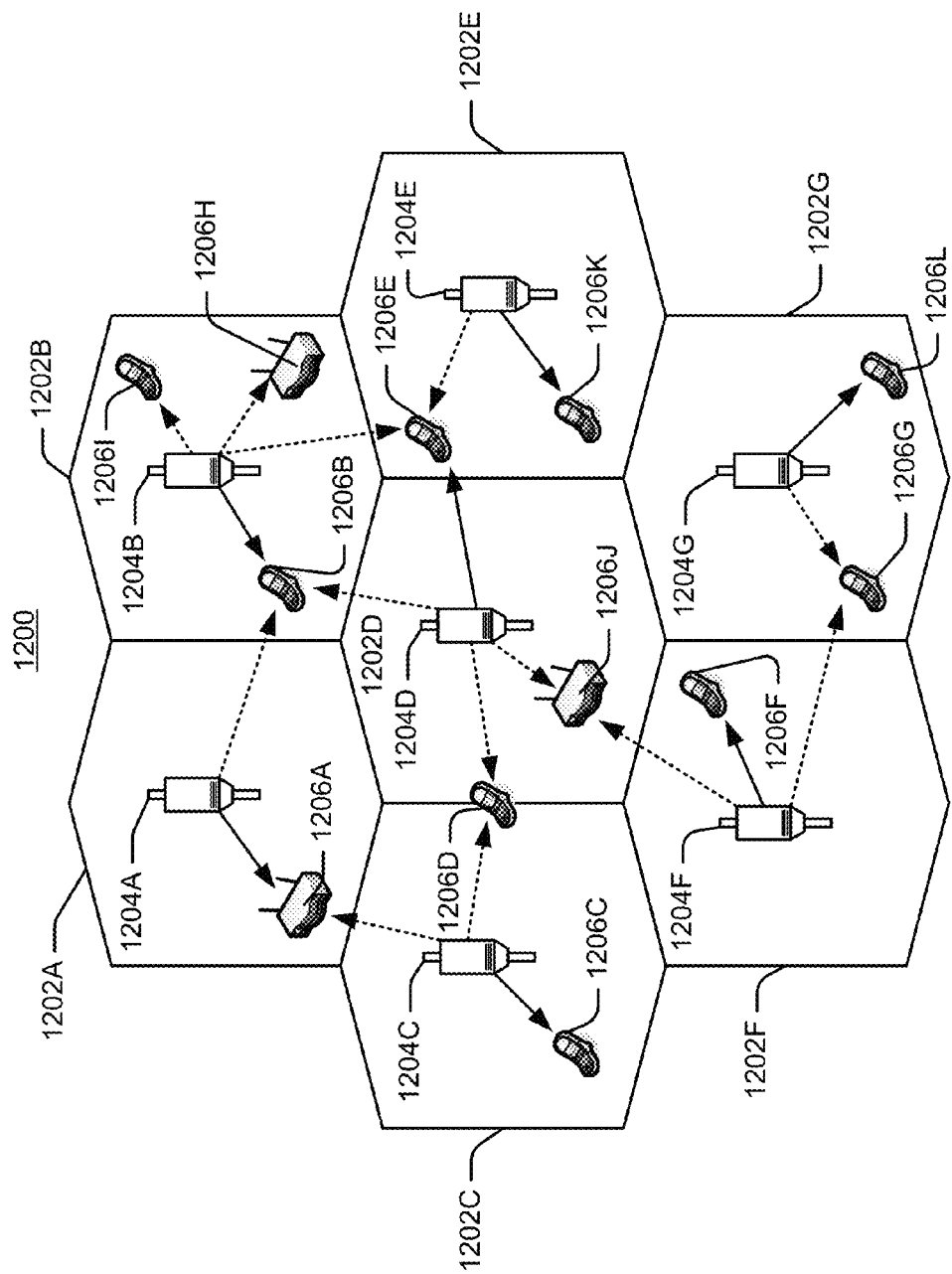
FIG. 12 is a simplified diagram of a wireless communication system.

FIG. 12 illustrates a wireless communication system 1200, configured to support a number of users, in which the teachings herein may be implemented. The system 1200 provides communication for multiple cells 1202, such as, for example, macro cells 1202A-1202G, with each cell being serviced by a corresponding access point 1204 (e.g., access points 1204A-1204G). As shown in FIG. 12, access terminals 1206 (e.g., access terminals 1206A-1206L) may be dispersed at various locations throughout the system over time. Each access terminal 1206 may communicate with one or more access points 1204 on a forward link (FL) and/or a reverse link (RL) at a given moment, depending upon whether the access terminal 1206 is active and whether it is in soft handoff, for example. The wireless communication system 1200 may provide service over a large geographic region. For example, macro cells 1202A-1202G may cover a few blocks in a neighborhood or several miles in a rural environment.

Figure 13:
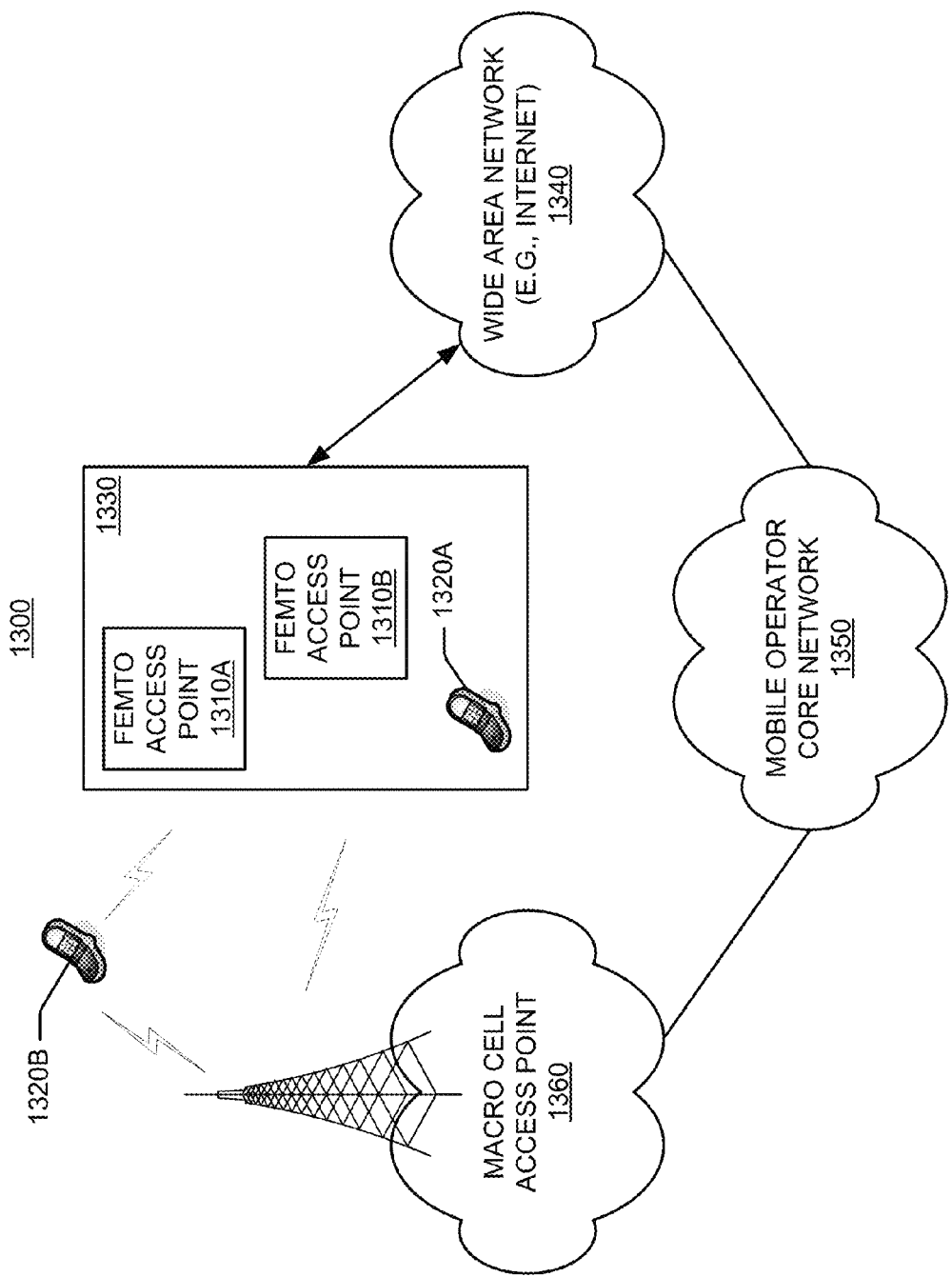
FIG. 13 is a simplified diagram of a wireless communication system including femto nodes.

FIG. 13 illustrates an exemplary communication system 1300 where one or more femto access points are deployed within a network environment. Specifically, the system 1300 includes multiple femto access points 1310 (e.g., femto access points 1310A and 1310B) installed in a relatively small scale network environment (e.g., in one or more user residences 1330). Each femto access point 1310 may be coupled to a wide area network 1340 (e.g., the Internet) and a mobile operator core network 1350 via a DSL router, a cable modem, a wireless link, or other connectivity means (not shown). As will be discussed below, each femto access point 1310 may be configured to serve associated access terminals 1320 (e.g., access terminal 1320A) and, optionally, other (e.g., hybrid or alien) access terminals 1320 (e.g., access terminal 1320B). In other words, access to femto access points 1310 may be restricted whereby a given access terminal 1320 may be served by a set of designated (e.g., home) femto access point(s) 1310 but may not be served by any non-designated femto access points 1310 (e.g., a neighbor's femto access point 1310).

Figure 14:
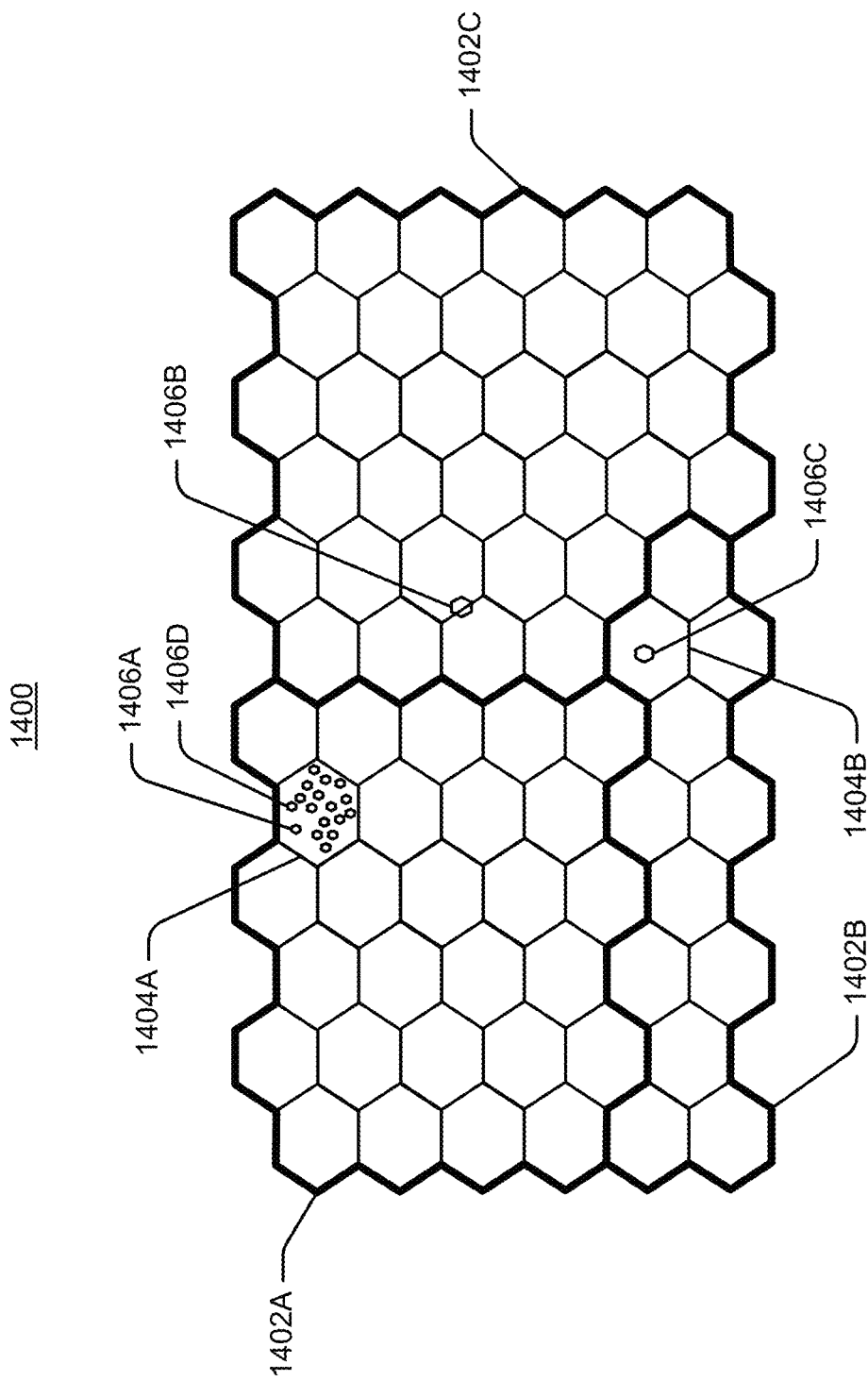
FIG. 14 is a simplified diagram illustrating coverage areas for wireless communication.

FIG. 14 illustrates an example of a coverage map 1400 where several tracking areas 1402 (or routing areas or location areas) are defined, each of which includes several macro coverage areas 1404. Here, areas of coverage associated with tracking areas 1402A, 1402B, and 1402C are delineated by the wide lines and the macro coverage areas 1404 are represented by the larger hexagons. The tracking areas 1402 also include femto coverage areas 1406. In this example, each of the femto coverage areas 1406 (e.g., femto coverage areas 1406B and 1406C) is depicted within one or more macro coverage areas 1404 (e.g., macro coverage areas 1404A and 1404B). It should be appreciated, however, that some or all of a femto coverage area 1406 may not lie within a macro coverage area 1404. In practice, a large number of femto coverage areas 1406 (e.g., femto coverage areas 1406A and 1406D) may be defined within a given tracking area 1402 or macro coverage area 1404. Also, one or more pico coverage areas (not shown) may be defined within a given tracking area 1402 or macro coverage area 1404.

Referring again to FIG. 13, the owner of a femto access point 1310 may subscribe to mobile service, such as, for example, 3G mobile service, offered through the mobile operator core network 1350. In addition, an access terminal 1320 may be capable of operating both in macro environments and in smaller scale (e.g., residential) network environments. In other words, depending on the current location of the access terminal 1320, the access terminal 1320 may be served by a macro cell access point 1360 associated with the mobile operator core network 1350 or by any one of a set of femto access points 1310 (e.g., the femto access points 1310A and 1310B that reside within a corresponding user residence 1330). For example, when a subscriber is outside his home, he is served by a standard macro access point (e.g., access point 1360) and when the subscriber is at home, he is served by a femto access point (e.g., access point 1310A). Here, a femto access point 1310 may be backward compatible with legacy access terminals 1320.

A femto access point 1310 may be deployed on a single frequency or, in the alternative, on multiple frequencies. Depending on the particular configuration, the single frequency or one or more of the multiple frequencies may overlap with one or more frequencies used by a macro access point (e.g., access point 1360).

In some aspects, an access terminal 1320 may be configured to connect to a preferred femto access point (e.g., the home femto access point of the access terminal 1320) whenever such connectivity is possible. For example, whenever the access terminal 1320A is within the user's residence 1330, it may be desired that the access terminal 1320A communicate only with the home femto access point 1310A or 1310B.

In some aspects, if the access terminal 1320 operates within the macro cellular network 1350 but is not residing on its most preferred network (e.g., as defined in a preferred roaming list), the access terminal 1320 may continue to search for the most preferred network (e.g., the preferred femto access point 1310) using a better system reselection (BSR) procedure, which may involve a periodic scanning of available systems to determine whether better systems are currently available and subsequently acquire such preferred systems. The access terminal 1320 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1310, the access terminal 1320 selects the femto access point 1310 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1310 that reside within the corresponding user residence 1330). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals.

Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 15:
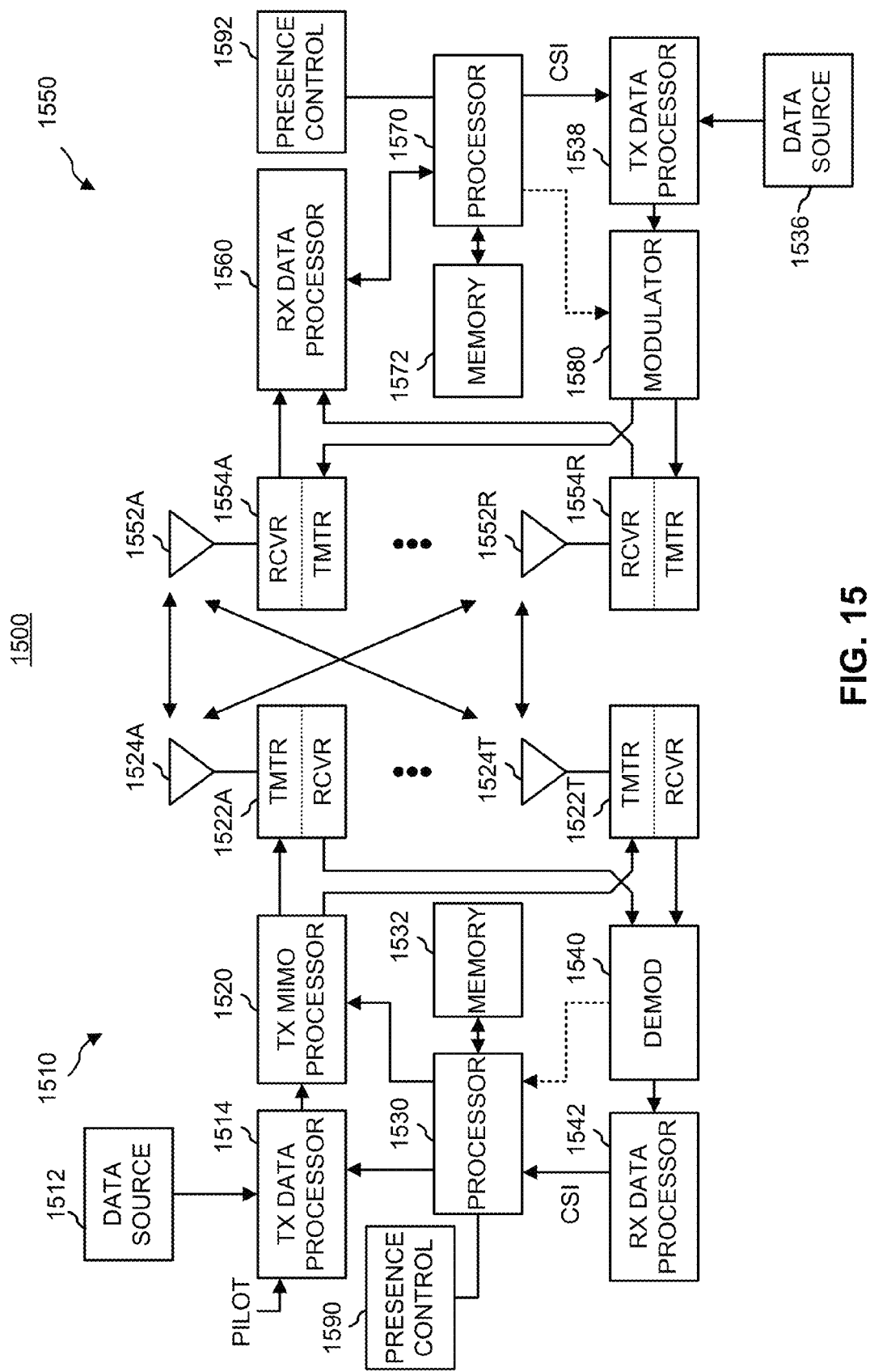
FIG. 15 is a simplified block diagram of several sample aspects of communication components.
Figure 16:
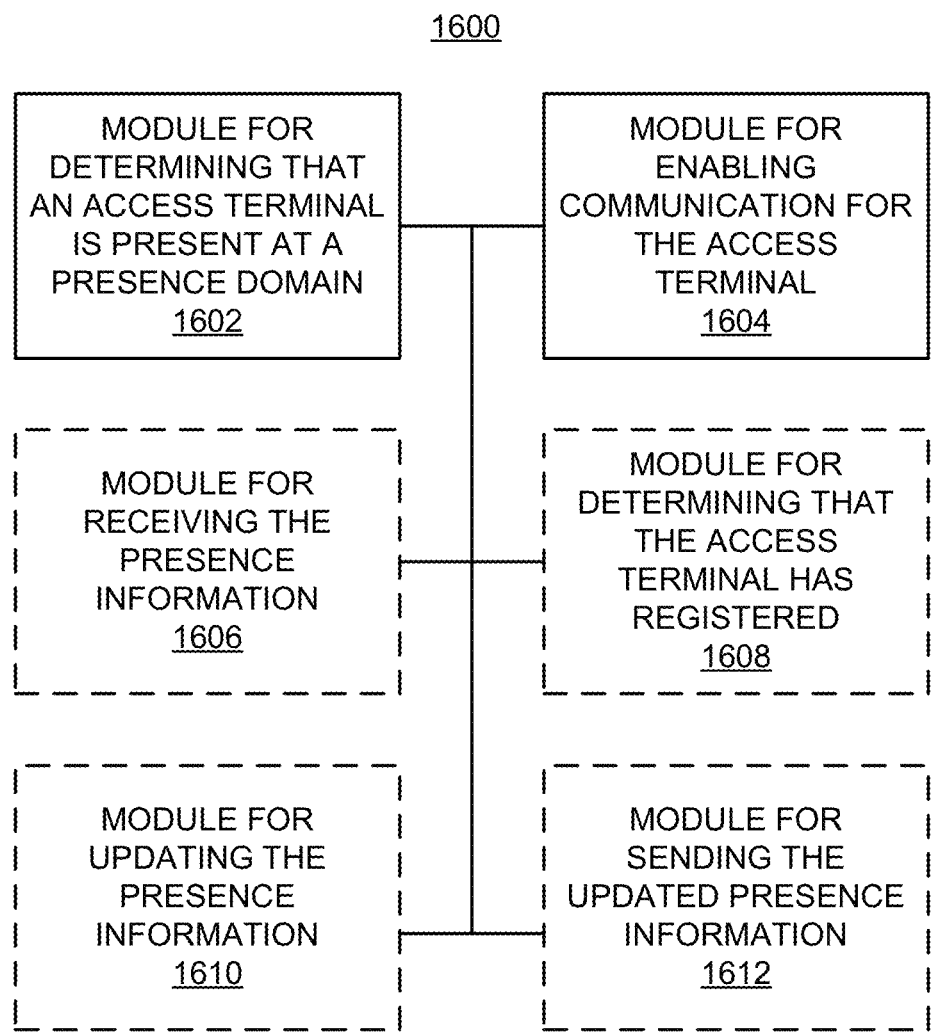
FIGS. 16-21 are simplified block diagrams of several sample aspects of apparatuses configured to provide presence-based communication as taught herein.
Figure 17:
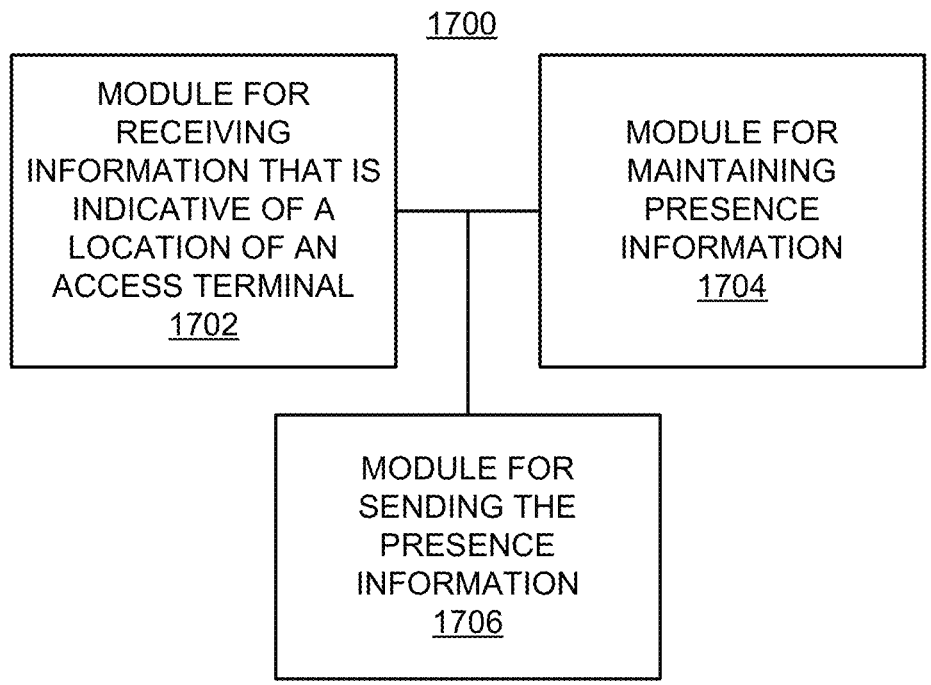
Figure 18:
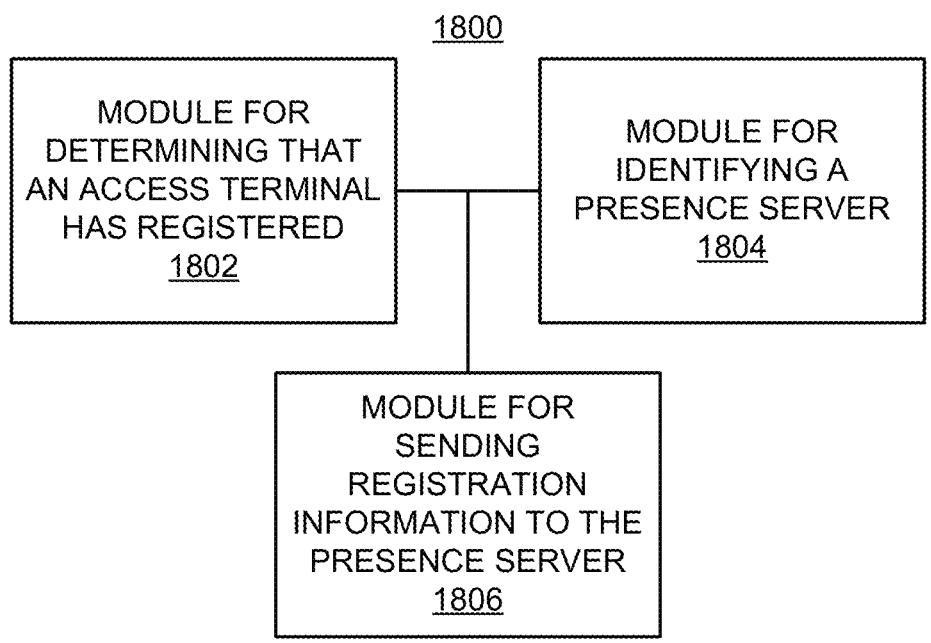
Figure 19:
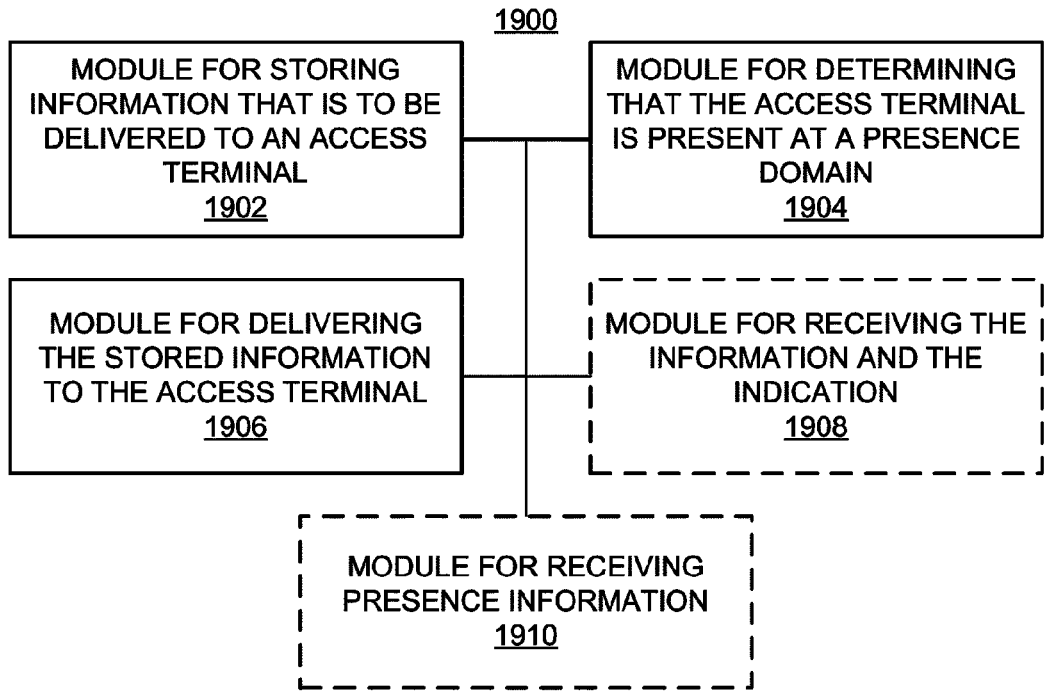
Figure 20:
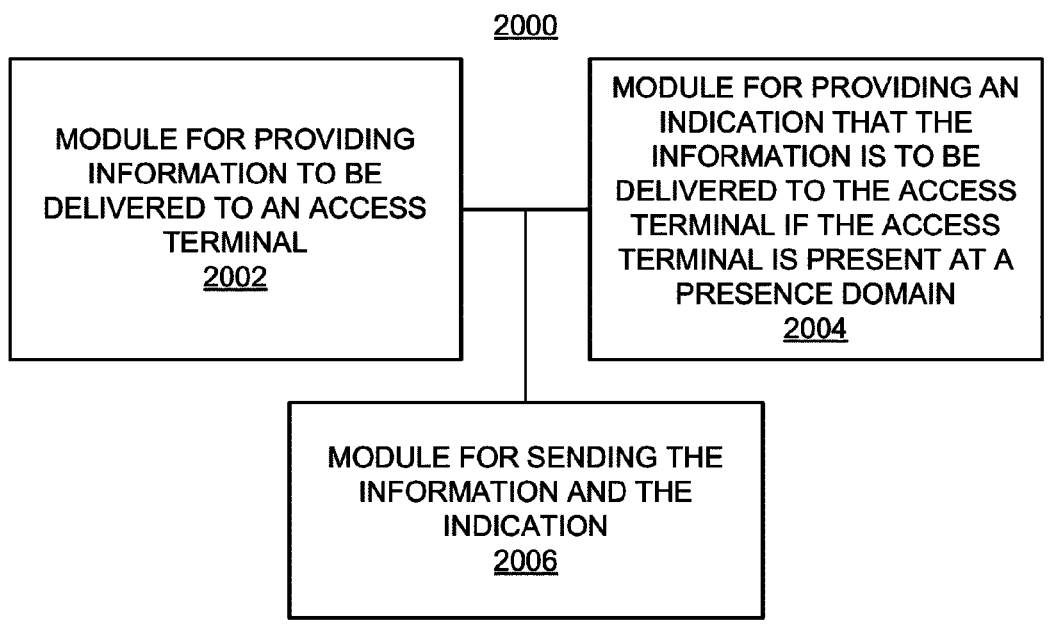
Figure 21:
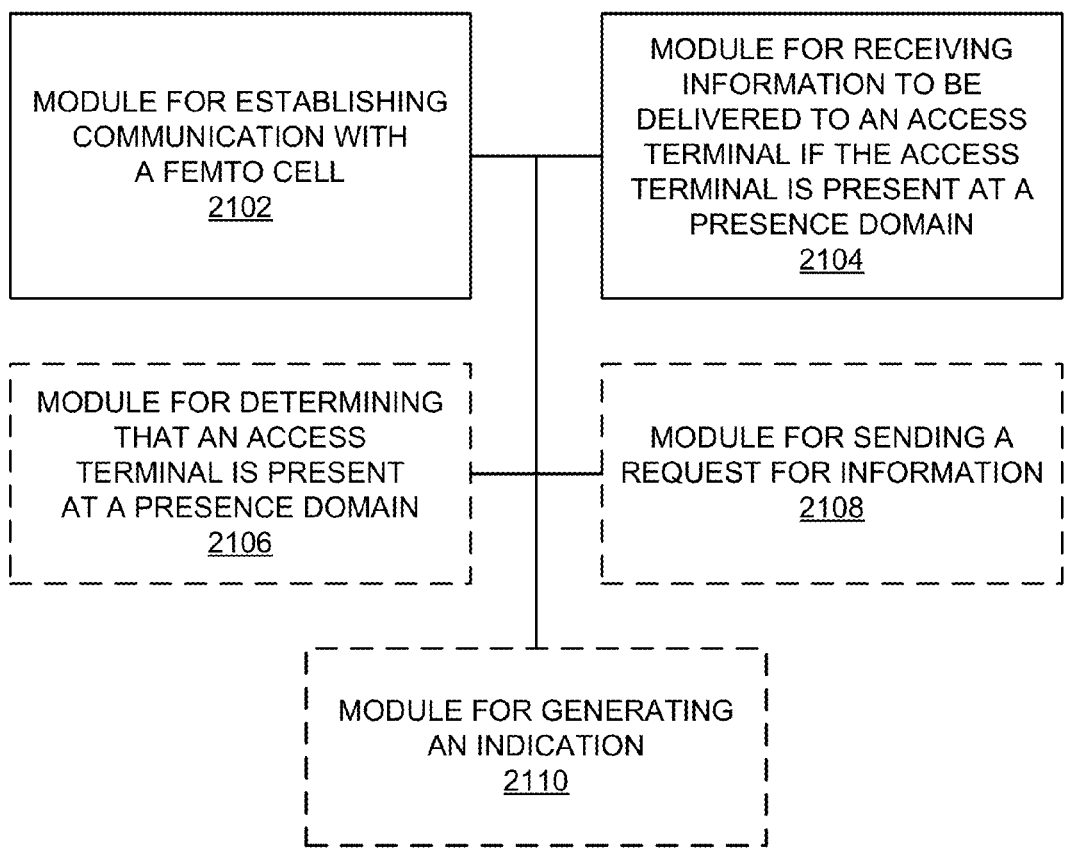

FIG. 15 illustrates a wireless device 1510 (e.g., an access point) and a wireless device 1550 (e.g., an access terminal) of a sample MIMO system 1500. At the device 1510, traffic data for a number of data streams is provided from a data source 1512 to a transmit (TX) data processor 1514. Each data stream may then be transmitted over a respective transmit antenna.

The TX data processor 1514 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1530. A data memory 1532 may store program code, data, and other information used by the processor 1530 or other components of the device 1510.

The modulation symbols for all data streams are then provided to a TX MIMO processor 1520, which may further process the modulation symbols (e.g., for OFDM). The TX MIMO processor 1520 then provides $N_T$ modulation symbol streams to $N_T$ transceivers (XCVR) 1522A through 1522T. In some aspects, the TX MIMO processor 1520 applies beam-forming weights to the symbols of the data streams and to the antenna from which the symbol is being transmitted.

Each transceiver 1522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1522A through 1522T are then transmitted from $N_T$ antennas 1524A through 1524T, respectively.

At the device 1550, the transmitted modulated signals are received by $N_R$ antennas 1552A through 1552R and the received signal from each antenna 1552 is provided to a respective transceiver (XCVR) 1554A through 1554R. Each transceiver 1554 conditions (e.g., filters, amplifies, and downconverts) a respective received signal, digitizes the conditioned signal to provide samples, and further processes the samples to provide a corresponding "received" symbol stream.

A receive (RX) data processor 1560 then receives and processes the $N_R$ received symbol streams from $N_R$ transceivers 1554 based on a particular receiver processing technique to provide $N_T$ "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the device 1510.

A processor 1570 periodically determines which pre-coding matrix to use (discussed below). The processor 1570 formulates a reverse link message comprising a matrix index portion and a rank value portion. A data memory 1572 may store program code, data, and other information used by the processor 1570 or other components of the device 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted back to the device 1510.

At the device 1510, the modulated signals from the device 1550 are received by the antennas 1524, conditioned by the transceivers 1522, demodulated by a demodulator (DEMOD) 1540, and processed by a RX data processor 1542 to extract the reverse link message transmitted by the device 1550. The processor 1530 then determines which pre-coding matrix to use for determining the beam-forming weights then processes the extracted message.

FIG. 15 also illustrates that the communication components may include one or more components that perform presence-related control operations as taught herein. For example, a presence control component 1590 may cooperate with the processor 1530 and/or other components of the device 1510 to send/receive presence-related information to/from another device (e.g., device 1550) as taught herein. Similarly, a presence control component 1592 may cooperate with the processor 1570 and/or other components of the device 1550 to send/receive presence-related information to/from another device (e.g., device 1510). It should be appreciated that for each device 1510 and 1550 the functionality of two or more of the described components may be provided by a single component. For example, a single processing component may provide the functionality of the presence control component 1590 and the processor 1530 and a single processing component may provide the functionality of the presence control component 1592 and the processor 1570.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

In view of the above, in some aspects a first method of communication, comprises: receiving information that is indicative of a location of an access terminal; maintaining presence information for the access terminal based on the received information, wherein the presence information is indicative of whether the access terminal is present at a presence domain defined for a set of at least one femto cell; and sending the presence information to at least one entity associated with the presence domain. In addition, in some aspects at least one of the following also may apply to the first method of communication: the received information comprises registration information that identifies a femto cell of the set at which the access terminal has registered; the at least one entity comprises at least one femto cell of the set; the at least one entity comprises at least one of: the access terminal or another access terminal; the presence information identifies at least one of: a physical location of the access terminal or a logical location of the access terminal; the presence information indicates whether the access terminal is in communication with a femto cell of the set or with another cell; the method is performed by a femto cell of the set; the method is performed by a core network entity; the presence information is sent as a result of a change in the presence information or as a result of receiving a request for the presence information from the at least one entity; the received information comprises registration information that identifies an access point at which the access terminal has registered, and the access terminal and the at least one entity comprise a plurality of access terminals assigned to a group of users associated with the presence domain.

In some aspects, functionality corresponding to one or more of the above aspects relating to the first method of communication may be implemented, for example, in an apparatus using structure as taught herein. In addition, a computer-program product may comprise codes configured to cause a computer to provide functionality corresponding to one or more of the above aspects relating to the first method of communication.

For example, in some aspects, a first apparatus for communication, comprises: a receiver configured to receive information that is indicative of a location of an access terminal; a processing system configured to maintain presence information for the access terminal based on the received information, wherein the presence information is indicative of whether the access terminal is present at a presence domain defined for a set of at least one femto cell; and a transmitter configured to send the presence information to at least one entity associated with the presence domain. In addition, in some aspects at least one of the following also may apply to the first apparatus: the received information comprises registration information that identifies a femto cell of the set at which the access terminal has registered; the at least one entity comprises at least one femto cell of the set; the at least one entity comprises at least one of: the access terminal or another access terminal; the presence information identifies at least one of: a physical location of the access terminal or a logical location of the access terminal; the presence information indicates whether the access terminal is in communication with a femto cell of the set or with another cell; the apparatus comprises a femto cell of the set; the apparatus comprises a core network entity; the presence information is sent as a result of a change in the presence information or as a result of receiving a request for the presence information from the at least one entity; the received information comprises registration information that identifies an access point at which the access terminal has registered, and the access terminal and the at least one entity comprise a plurality of access terminals assigned to a group of users associated with the presence domain.

In some aspects, a second apparatus for communication, comprises: means for receiving information that is indicative of a location of an access terminal; means for maintaining presence information for the access terminal based on the received information, wherein the presence information is indicative of whether the access terminal is present at a presence domain defined for a set of at least one femto cell; and means for sending the presence information to at least one entity associated with the presence domain. In addition, in some aspects at least one of the following also may apply to the second apparatus: the received information comprises registration information that identifies a femto cell of the set at which the access terminal has registered; the at least one entity comprises at least one femto cell of the set.

In some aspects, a first computer-program product, comprises: computer-readable medium comprising code for causing a computer to: receive information that is indicative of a location of an access terminal; maintain presence information for the access terminal based on the received information, wherein the presence information is indicative of whether the access terminal is present at a presence domain defined for a set of at least one femto cell; and send the presence information to at least one entity associated with the presence domain. In addition, in some aspects at least one of the following also may apply to the first computer-program product: the received information comprises registration information that identifies a femto cell of the set at which the access terminal has registered; the at least one entity comprises at least one femto cell of the set.

In some aspects, a second method of communication, comprises: determining that an access terminal has registered at an access point; identifying a presence server that maintains presence information for the access terminal, wherein the presence information indicates whether the access terminal is present at a presence domain defined for a set of at least one femto cell; and sending registration information to the presence server, wherein the registration information indicates that the access terminal has registered at the access point. In addition, in some aspects at least one of the following also may apply to the second method of communication: the method is performed by the access point; the access point comprises a cellular macro access point; the identification of the presence server comprises identifying a presence domain with which the access terminal is associated; the presence server is embodied in a femto cell of the set; the presence server is embodied in a cellular core network entity.

In some aspects, functionality corresponding to one or more of the above aspects relating to the second method of communication may be implemented, for example, in an apparatus using structure as taught herein. In addition, a computer-program product may comprise codes configured to cause a computer to provide functionality corresponding to one or more of the above aspects relating to the second method of communication.

For example, in some aspects, a third apparatus for communication, comprises: a processing system configured to determine that an access terminal has registered at an access point, and further configured to identify a presence server that maintains presence information for the access terminal, wherein the presence information indicates whether the access terminal is present at a presence domain defined for a set of at least one femto cell; and a transmitter configured to send registration information to the presence server, wherein the registration information indicates that the access terminal has registered at the access point. In addition, in some aspects at least one of the following also may apply to the third apparatus: the apparatus comprises the access point; the access point comprises a cellular macro access point; the identification of the presence server comprises identifying a presence domain with which the access terminal is associated; the presence server is embodied in a femto cell of the set; the presence server is embodied in a cellular core network entity.

In some aspects, a fourth apparatus for communication, comprises: means for determining that an access terminal has registered at an access point; means for identifying a presence server that maintains presence information for the access terminal, wherein the presence information indicates whether the access terminal is present at a presence domain defined for a set of at least one femto cell; and means for sending registration information to the presence server, wherein the registration information indicates that the access terminal has registered at the access point. In addition, in some aspects at least one of the following also may apply to the fourth apparatus: the identification of the presence server comprises identifying a presence domain with which the access terminal is associated.

In some aspects, a second computer-program product, comprises: computer-readable medium comprising code for causing a computer to: determine that an access terminal has registered at an access point; identify a presence server that maintains presence information for the access terminal, wherein the presence information indicates whether the access terminal is present at a presence domain defined for a set of at least one femto cell; and send registration information to the presence server, wherein the registration information indicates that the access terminal has registered at the access point. In addition, in some aspects at least one of the following also may apply to the second computer-program product: the identification of the presence server comprises identifying a presence domain with which the access terminal is associated.

In some aspects, a third method of communication, comprises: storing information that is to be delivered to an access terminal; determining that the access terminal is present at a presence domain defined for a set of at least one femto cell; and delivering the stored information to the access terminal as a result of the determination that the access terminal is present at the presence domain. In addition, in some aspects at least one of the following also may apply to the third method of communication: the information is stored with an indication that the information is to be delivered to the access terminal if the access terminal is present at the presence domain; the method further comprises receiving the information and the indication from an entity that generated the information and the indication; the entity comprises another access terminal; the method further comprises receiving presence information for the access terminal, wherein the determination that the access terminal is present at the presence domain is based on the received presence information; the presence information is received from a presence server that keeps track of whether the access terminal is present at the presence domain; the presence information indicates whether the access terminal is in communication with a femto cell of the set or with another cell; the method is performed by a femto cell of the set; the method is performed by a cellular core network entity.

In some aspects, functionality corresponding to one or more of the above aspects relating to the third method of communication may be implemented, for example, in an apparatus using structure as taught herein. In addition, a computer-program product may comprise codes configured to cause a computer to provide functionality corresponding to one or more of the above aspects relating to the third method of communication.

For example, in some aspects, a fifth apparatus for communication, comprises: a memory component configured to store information that is to be delivered to an access terminal; a processing system configured to determine that the access terminal is present at a presence domain defined for a set of at least one femto cell, and further configured to deliver the stored information to the access terminal as a result of the determination that the access terminal is present at the presence domain. In addition, in some aspects at least one of the following also may apply to the fifth apparatus: the information is stored with an indication that the information is to be delivered to the access terminal if the access terminal is present at the presence domain; the apparatus further comprises a receiver configured to receive the information and the indication from an entity that generated the information and the indication; the entity comprises another access terminal; the apparatus further comprises a receiver configured to receive presence information for the access terminal, wherein the determination that the access terminal is present at the presence domain is based on the received presence information; the presence information is received from a presence server that keeps track of whether the access terminal is present at the presence domain; the presence information indicates whether the access terminal is in communication with a femto cell of the set or with another cell; the apparatus comprises a femto cell of the set; the apparatus comprises a cellular core network entity.

In some aspects, a sixth apparatus for communication, comprises: means for storing information that is to be delivered to an access terminal; means for determining that the access terminal is present at a presence domain defined for a set of at least one femto cell; and means for delivering the stored information to the access terminal as a result of the determination that the access terminal is present at the presence domain. In addition, in some aspects at least one of the following also may apply to the sixth apparatus: the information is stored with an indication that the information is to be delivered to the access terminal if the access terminal is present at the presence domain; the apparatus further comprises means for receiving the information and the indication from an entity that generated the information and the indication; the apparatus further comprises means for receiving presence information for the access terminal, wherein the determination that the access terminal is present at the presence domain is based on the received presence information.

In some aspects, a third computer-program product, comprises: computer-readable medium comprising code for causing a computer to: store information that is to be delivered to an access terminal; determine that the access terminal is present at a presence domain defined for a set of at least one femto cell; and deliver the stored information to the access terminal as a result of the determination that the access terminal is present at the presence domain. In addition, in some aspects at least one of the following also may apply to the third computer-program product: the information is stored with an indication that the information is to be delivered to the access terminal if the access terminal is present at the presence domain; the computer-readable medium further comprises code for causing the computer to receive the information and the indication from an entity that generated the information and the indication; the computer-readable medium further comprises code for causing the computer to receive presence information for the access terminal, and the determination that the access terminal is present at the presence domain is based on the received presence information.

The functionality described herein (e.g., with regard to one or more of the accompanying figures) may correspond in some aspects to similarly designated "means for" functionality in the appended claims. Referring to FIGS. 16-21, apparatuses 1600, 1700, 1800, 1900, 2000, and 2100 are represented as a series of interrelated functional modules. Here, a module for determining that an access terminal is present at a presence domain 1602 may correspond at least in some aspects to, for example, a processing system as discussed herein. A module for enabling communication for the access terminal 1604 may correspond at least in some aspects to, for example, a transceiver as discussed herein. A module for receiving the presence information 1606 may correspond at least in some aspects to, for example, a transceiver as discussed herein. A module for determining that the access terminal has registered 1608 may correspond at least in some aspects to, for example, a processing system as discussed herein. A module for updating the presence information 1610 may correspond at least in some aspects to, for example, a processing system as discussed herein. A module for sending the updated presence information 1612 may correspond at least in some aspects to, for example, a transceiver as discussed herein. A module for receiving information that is indicative of a location of an access terminal 1702 may correspond at least in some aspects to, for example, a transceiver as discussed herein. A module for maintaining presence information 1704 may correspond at least in some aspects to, for example, a processing system and/or a memory component as discussed herein. A module for sending the presence information 1706 may correspond at least in some aspects to, for example, a transceiver as discussed herein. A module for determining that an access terminal has registered 1802 may correspond at least in some aspects to, for example, a processing system as discussed herein. A module for identifying a presence server 1804 may correspond at least in some aspects to, for example, a processing system as discussed herein. A module for sending registration information to the presence server 1806 may correspond at least in some aspects to, for example, a transceiver as discussed herein. A module for storing information that is to be delivered to an access terminal 1902 may correspond at least in some aspects to, for example, a memory component as discussed herein. A module for determining that the access terminal is present at a presence domain 1904 may correspond at least in some aspects to, for example, a processing system as discussed herein. A module for delivering the stored information to the access terminal 1906 may correspond at least in some aspects to, for example, a processing system and/or a transceiver as discussed herein. A module for receiving the information and the indication 1908 may correspond at least in some aspects to, for example, a transceiver as discussed herein. A module for receiving presence information 1910 may correspond at least in some aspects to, for example, a transceiver as discussed herein. A module for providing information to be delivered to an access terminal 2002 may correspond at least in some aspects to, for example, a processing system as discussed herein. A module for providing an indication that the information is to be delivered to the access terminal if the access terminal is present at a presence domain 2004 may correspond at least in some aspects to, for example, a processing system as discussed herein. A module for sending the information and the indication 2006 may correspond at least in some aspects to, for example, a transceiver as discussed herein. A module for establishing communication with a femto cell 2102 may correspond at least in some aspects to, for example, a processing system as discussed herein. A module for receiving information to be delivered to an access terminal if the access terminal is present at a presence domain 2104 may correspond at least in some aspects to, for example, a receiver as discussed herein. A module for determining that the access terminal is present at a presence domain 2106 may correspond at least in some aspects to, for example, a processing system as discussed herein. A module for sending a request for information 2108 may correspond at least in some aspects to, for example, a processing system as discussed herein. A module for generating an indication 2110 may correspond at least in some aspects to, for example, a user interface as discussed herein.

The functionality of the modules of FIGS. 16-21 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 16-21 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by processing system (e.g., comprising one or more integrated circuits). The processing system may comprise a general purpose processor, a special purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the processing system, outside of the processing system, or both. A processing system may also be implemented as a combination of computing devices, e.g., a combination of a DSP and a microprocessor, a plurality of microprocessors, one or more microprocessors in conjunction with a DSP core, or any other such configuration.

The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be responsible for managing the bus and general processing, including the execution of software stored on the machine-readable media. Software shall be construed broadly to mean instructions, data, or any combination thereof, whether referred to as software, firmware, middleware, microcode, hardware description language, or otherwise.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media. It should be appreciated that a computer-readable medium may be implemented in any suitable computer-program product.

Any specific order or hierarchy of steps in any disclosed process is an example of a sample approach. Based upon design preferences, the specific order or hierarchy of steps in the processes may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   providing information to be delivered to a mobile station specified to receive the information;
   providing an indication that the information is to be delivered to the mobile station specified to receive the information when the mobile station is present at a presence domain that facilitates asynchronous communication of the information in the presence domain for a set of at least one femto cell, wherein the set is connected to a cellular network comprising macro cells and a core network and presence in the presence domain comprises being in a femto coverage area of the set; and
   sending from another mobile station, prior to the specified mobile station entering the presence domain, the information and the indication to a server configured to store the information for delivery to the specified mobile station when the another mobile station is not present in the presence domain.

2. The method of claim 1, wherein the providing of the indication comprises determining that the mobile station is associated with the presence domain.

3. The method of claim 1, wherein the providing of the indication comprises determining that the information is not to be delivered to the mobile station until the mobile station is present at the presence domain.

4. The method of claim 1, wherein the server comprises a femto cell of the set.

5. The method of claim 1, wherein the server comprises a cellular core network entity.

6. An apparatus for communication, comprising:
   a processing system configured to provide information to be delivered to a mobile station specified to receive the information, and further configured to provide an indication that the information is to be delivered to the mobile station specified to receive the information when the mobile station is present at a presence domain that facilitates asynchronous communication of the information in the presence domain for a set of at least one femto cell, wherein the set is connected to a cellular network comprising macro cells and a core network and presence in the presence domain comprises being in a femto coverage area of the set; and
   a transmitter configured to send from another mobile station, prior to the specified mobile station entering the presence domain, the information and the indication to a server configured to store the information for delivery to the specified mobile station when the another mobile station is not present in the presence domain.

7. The apparatus of claim 6, wherein the providing of the indication comprises determining that the mobile station is associated with the presence domain.

8. The apparatus of claim 6, wherein the providing of the indication comprises determining that the information is not to be delivered to the mobile station until the mobile station is present at the presence domain.

9. The apparatus of claim 6, wherein the server comprises a femto cell of the set.

10. The apparatus of claim 6, wherein the server comprises a cellular core network entity.

11. An apparatus for communication, comprising:
    means for providing information to be delivered to a mobile station specified to receive the information;
    means for providing an indication that the information is to be delivered to the mobile station specified to receive the information when the mobile station is present at a presence domain that facilitates asynchronous communication of the information in the presence domain for a set of at least one femto cell, wherein the set is connected to a cellular network comprising macro cells and a core network and presence in the presence domain comprises being in a femto coverage area of the set; and means for sending from another mobile station, prior to the specified mobile station entering the presence domain, the information and the indication to a server configured to store the information for delivery to the specified mobile station when the another mobile station is not present in the presence domain.

12. A computer-program product, comprising:

non-transitory computer-readable medium comprising code for causing a computer to:

provide information to be delivered to a mobile station specified to receive the information;

provide an indication that the information is to be delivered to the mobile station specified to receive the information when the mobile station is present at a presence domain that facilitates asynchronous communication of the information in the presence domain for a set of at least one femto cell, wherein the set is connected to a cellular network comprising macro cells and a core network and presence in the presence domain comprises being in a femto coverage area of the set; and send from another mobile station, prior to the specified mobile station entering the presence domain, the information and the indication to a server configured to store the information for delivery to the specified mobile station when the another mobile station is not present in the presence domain.

13. A method of communication, comprising:

establishing, at a mobile station, communication with a femto cell associated with a presence domain;

receiving, as a result of establishing the communication, information to be delivered to the mobile station when the mobile station is present at the presence domain, wherein the information relates to a presence of at least one other mobile station;

determining that the mobile station is present at the presence domain based on the establishing of the communication; and sending a request from the mobile station for the information as a result of the determination, wherein the information is received, as a result sending the request, from a server configured to store the information facilitating asynchronous communication of the information when the at least one other mobile station is not present.

14. The method of claim 13, wherein the establishing of the communication comprises registering the mobile station at the femto cell.

15. The method of claim 13, further comprising generating an indication at the mobile station based on the received information.

16. The method of claim 13, wherein the information is received from a presence server for the presence domain.

17. An apparatus for communication, comprising:

a processing system configured to establish, at the apparatus, communication with a femto cell associated with a presence domain, to determine that the apparatus is present at the presence domain based on the establishing of the communication, and to send a request from the mobile station for the information as a result of the determination, wherein the information relates to a presence of at least one other mobile station, and the information is received, as a result of sending the request, from a server configured to store the information facilitating asynchronous communication of the information when the at least one other mobile station is not present; and a receiver configured to receive, as a result of establishing the communication, information to be delivered to the apparatus when the apparatus is present at the presence domain.

18. The apparatus of claim 17, wherein the establishing of the communication comprises registering the apparatus at the femto cell.

19. The apparatus of claim 17, further comprising a user interface configured to generate an indication at the apparatus based on the received information.

20. The apparatus of claim 17, wherein the information is received from a presence server for the presence domain.

21. An apparatus for communication, comprising:

means for establishing, at the apparatus, communication with a femto cell associated with a presence domain;

means for receiving, as a result of establishing the communication, information to be delivered to the apparatus when the apparatus is present at the presence domain, wherein the information relates to a presence of at least one other mobile station;

means for determining that the apparatus is present at the presence domain based on the establishing of the communication; and means for sending a request from the mobile station for the information as a result of the determination, wherein the information is received, as a result of sending the request, from a server configured to store the information facilitating asynchronous communication of the information when the at least one other mobile station is not present.

22. A computer-program product, comprising:

non-transitory computer-readable medium comprising code for causing a computer to:

establish, at a mobile station, communication with a femto cell associated with a presence domain;

receive, as a result of establishing the communication, information to be delivered to the mobile station when the mobile station is present at the presence domain, wherein the information relates to a presence of at least one other mobile station;

determine that the mobile station is present at the presence domain based on the establishing of the communication; and send a request for the information as a result of the determination, wherein the information is received, as a result of sending the request, from a server configured to store the information facilitating asynchronous communication of the information when the at least one other mobile station is not present.

* * * * *